US012644522B2

(12) United States Patent
Dicker

(10) Patent No.: US 12,644,522 B2
(45) Date of Patent: Jun. 2, 2026

(54) VALVE FOR OBTURATING A PIPE

(71) Applicant: ACTUATION LAB LTD, Bristol (GB)

(72) Inventor: Michael Patrick Maher Dicker, Bristol (GB)

(73) Assignee: ACTUATION LAB LTD, Bristol (GB)

( * ) Notice: Subject to any disclaimer, the term of this patent is extended or adjusted under 35 U.S.C. 154(b) by 88 days.

(21) Appl. No.: 18/844,844

(22) PCT Filed: Mar. 7, 2023

(86) PCT No.: PCT/GB2023/050530
§ 371 (c)(1),
(2) Date: Sep. 6, 2024

(87) PCT Pub. No.: WO2023/170399
PCT Pub. Date: Sep. 14, 2023

(65) Prior Publication Data
US 2025/0043867 A1 Feb. 6, 2025

(30) Foreign Application Priority Data

Mar. 7, 2022 (GB) ...................................... 2203148

(51) Int. Cl.
F16K 1/20 (2006.01)
F16K 1/36 (2006.01)
F16K 1/42 (2006.01)

(52) U.S. Cl.
CPC .............. *F16K 1/2007* (2013.01); *F16K 1/36* (2013.01); *F16K 1/42* (2013.01)

(58) Field of Classification Search
CPC . F16K 1/2007; F16K 1/36; F16K 1/42; F16K 1/165; F16K 1/2014; F16K 1/2021; F16K 1/24
See application file for complete search history.

(56) References Cited

U.S. PATENT DOCUMENTS

| | | | |
|---|---|---|---|
| 1,248,926 A | 12/1917 | Schantz | |
| 3,275,289 A | 9/1966 | Fawkes | |

(Continued)

FOREIGN PATENT DOCUMENTS

| | | |
|---|---|---|
| CN | 109442049 A | 3/2019 |
| DE | 350071 C | 3/1922 |

(Continued)

OTHER PUBLICATIONS

International Search and Written Opinion received in Application No. PCT/GB2023/050530 mailed Jun. 9, 2023.

(Continued)

*Primary Examiner* — Patrick C Williams
(74) *Attorney, Agent, or Firm* — Meunier Carlin & Curfman LLC

(57) ABSTRACT

The present invention provides a valve (1) for obturating a pipe (2), having: a central axis X, a body (10) having an inlet (12) and an outlet (14), defining an aperture (18), a plurality of obturating portions (30) for obturating said aperture (18), a valve mechanism (70), the plurality of obturating portions (30), moveable from a first closed position (8) to a second open position (9), a valve seat (20), a plurality of first fixed pivot mounts (41) on the body (10) and wherein each obturating portion (30) is pivotally mounted within a first fixed pivot mount (41); a plurality of second non-fixed pivot mounts (42) connected to the valve mechanism (70) and wherein each obturating portion (30) is pivotally mounted within a second non-fixed pivot mount (42); and wherein the valve mechanism (70) and hence each second non-fixed pivot mount (42) is movable in three dimensions.

35 Claims, 16 Drawing Sheets

(56)         References Cited

U.S. PATENT DOCUMENTS

| | | | | |
|---|---|---|---|---|
| 3,306,571 | A  * | 2/1967 | Bussi | G21D 1/02 |
| | | | | 251/231 |
| 3,749,358 | A  * | 7/1973 | Bates | F16K 1/2028 |
| | | | | 384/252 |
| 3,876,179 | A  * | 4/1975 | Baumann | F16K 1/24 |
| | | | | 137/454.2 |
| 4,019,532 | A  * | 4/1977 | Schittek | F16K 15/033 |
| | | | | 137/527 |
| 4,634,094 | A  * | 1/1987 | Geiser | F16K 31/5282 |
| | | | | 74/25 |
| 5,244,011 | A | 9/1993 | Feldinger | |
| 6,474,623 | B1 * | 11/2002 | Davies | F16K 1/2007 |
| | | | | 251/298 |
| 9,353,869 | B2 | 5/2016 | Bormioli | |
| 2011/0095220 | A1 * | 4/2011 | Geiser | F16K 1/2007 |
| | | | | 251/298 |
| 2018/0094573 | A1 * | 4/2018 | Schoenherr | F02B 37/186 |
| 2020/0166146 | A1 | 5/2020 | Kielczykowski et al. | |

FOREIGN PATENT DOCUMENTS

| | | | |
|---|---|---|---|
| DE | 202019105587 | U1 | 11/2019 |
| EP | 3741678 | A1 | 11/2020 |
| FR | 1184986 | A | 7/1959 |
| GB | 302526 | A | 12/1928 |

OTHER PUBLICATIONS

Combined Search and Examination Report received in Application No. GB2203148.8, mailed Nov. 7, 2022.

* cited by examiner

VALVE FOR OBTURATING A PIPE

FIELD

The present invention relates to valves. More particularly, the present invention relates to a valve for obturating a pipe for carrying fluids.

BACKGROUND

A valve Is used to seal a pipe to prevent flow of fluid therein. A fluid may be a liquid or a gas. There are a number of challenges that are presented when designing a valve. A valve must be able to operate to open and close under high pressure and high flow rates that may be seen in fluid flowing in a pipe. The success of a design of valve is measured on how well it prevents flow when in the closed, sealed position and at what pressures it may withstand and how much obstruction or reduction in flow the valve provides compared to a section of plane pipe when the valve is in the open position. An ideal valve will create a perfect seal at high pressures in both flow directions when in the closed position and allow clean flow of fluid through the open valve in the same fashion as a section of plane pipe.

The second challenge when designing a valve is allowing the valve to move between the open and closed positions when pressurised fluid is being held by the valve, in either direction or is flowing at high velocity in the pipe. The pressure of fluid on valve sealing or obturating portions can create substantial friction between sealing faces and a valve seat or between components of the valve mechanism which must be overcome by actuators. High friction and high forces must be overcome to allow a valve to function, requiring greater force to actuate a valve and thus more powerful actuators. High force and high friction also result in high wear.

Butterfly valves are a common design employed for flow control in pipes and other conduits carrying fluid. They consist of a disc or valve face that rotates in the pipe body on a shaft that rotates about a pivot at each end. By rotating the shaft 90 degrees, the disc can move from being oriented perpendicular to the flow in the pipe, thereby blocking it, to parallel, allowing the flow to pass relatively unimpeded. Butterfly valves are beneficial due to their fast and simple rotational operation, lightweight, compact length, and simple operation.

However, since the disc remains in the centre of the pipe flow, partially blocking the pipe, even when fully open, the flow efficiency through the valve is not as high as those with full bore unimpeded flow such as ball valves. However, ball valves bring their own issues discussed below. Having the disc remain in the centre of the flow while open also leaves it susceptible to erosions from particulate matter in the stream. While the basic concept of a butterfly valve is straight forward, the details of how to achieve a tight seal between rotating disc and stationary seat in the valve body when closed are more complicated. There are three different types of butterfly valve, all of which take a different approach to achieving this seal between disc and seat. These can be referred to as zero-offset, double-offset, and triple-offset butterfly valves.

Zero-offset butterfly valves as shown in FIG. 1 and disclosed in U.S. Pat. No. 1,248,926A have a valve seat S1, an obturating disc/valve face VF1 mounted on a shaft axis VSA1 located centrally in the middle of the valve seat S1 about which the valve disc VF1 rotates. This means that the force generated by fluid pressure on the valve when closed acts directly through the shaft centreline at its centre of pressure CP1.1, producing no resulting torque on the shaft. In this way, zero-offset valves are pressure balanced, in that there is no net force preventing or contributing to operation of the valve because of the fluid pressure. However, there is significant force and torque resulting from frictional/deformation forces between sealing faces of the disc and the seat in sealing regions at 1.01-1.04. For a disc with finite thickness to operate from a zero-offset configuration, the disc must interfere/interact with the seat to provide a seal. As a result, zero offset valves must employ a deformable or soft (generally rubber) seat and or disc sealing face. The seat and disc are therefore subjected to significant wear from interactions in operation and require significant torque to operate, while the soft sealing materials make the valve unsuitable for fire safe applications.

Double-offset butterfly valves as shown in FIG. 2 and disclosed in GB302526A are also referred to as eccentric, double eccentric or high-performance butterfly valves. They were developed to overcome the deficiencies of the zero-offset valve. In the double-offset valve the position of the vertical shaft axis VSA2 is offset O1.1 behind the transverse plane C of the seat centreline DCL and offset O2.1 to the side of the valve centreline VCL. The seat is conical. This means upon shaft rotation the disc is moved in a cam like motion out of a conical profile seat S2 with potentially no frictional interaction or wear between disc and seat. However, no interference is only achieved if VSA2 is in region Q designated by the dotted section, defined by bounding lines 2.01 and 2.02, where the seat clearance angles SCA1.1 and SCA2.1 formed between 2.01, 2.02 and the conical seat profile must be greater than 90 degrees. This clearance when opening allows for the use of fire safe metal seals and extends component life. However, to achieve this, the shaft must be offset a significant distance away from the centre of the pipe, the location where the fluid pressure acts on the disc CP1.2. This means the valve is no longer pressure balanced, although frictional forces are now minimised, significant torques result from the moment generated by the offset (moment arm) O2.1 between shaft and pressure centre CP1.2. In addition, when the valve face VF2 opens to position VF2O the structure linking disk to offset shaft significantly impedes the flow through the valve. As a result, most double offset valves still involve interaction between seat and disc (often employing spring loaded metal seals to facilitate this) as the torque and flow penalty incurred by the required offsets to fully eliminate seat/disc interaction is too great.

Triple-offset butterfly valves as shown in FIG. 3 and disclosed in U.S. Pat. No. 3,275,289A were invented to eliminate all friction seal interaction without also having excessively large operating torque and overly restricted pipe flow. Like the double-offset valve, this valve also offsets the shaft both behind the disk O1.2 and to the side of the pipe centre line O2.2, but these offsets O1.2, O2.2 are reduced by angling (the "third" offset) the centre line of the conical profile of the seat relative to the central axis X of the pipe. While triple offset valves successfully minimise operational seat wear, allowing for the use of metal-to-metal seals, they are not pressure balanced so still require significant torque to open. In addition, since there is no physical interaction between the disc and seat, force must be applied to form a seal in operation (these are so-called torque seated valves). Although fluid pressure can contribute to the sealing effectiveness of the valve if flow is in a preferred orientation, the effectiveness of this is limited by the oblique angle the face makes with the offset conical seat. Similarly, seating forces from input torque are limited by the small contact angles (SCA-90 degrees) between seat and disc required to minimise the shaft offset and resulting pressure torque. In addition, although reduced compared to a double offset valve, VF3 still significantly restricts flow through the valve when open VF30.

Alternative types of known valves do achieve unrestricted flow through the valve when open. Such valves include gate valves or ball valves. Gate valves can be pressure balanced (slab and parallel slide type) but these have significant friction and wear between face and seat during operation. Wedge and expanding type gate valves remove this friction but are no longer pressure balanced. In addition, the linear motion of gate valves can make fast actuation prohibitive while adding to the challenge of stem sealing. Ball valves combine a pressure balanced design with desirable quarter-turn (90 degree) actuation, but friction between the valve face (ball) and seat occurs during operation.

SUMMARY OF INVENTION

Accordingly the current invention provides a valve that combines three desirable features, not previously achieved together in other valve designs:
1. Non-frictional seating: Akin to offset butterfly valves, minimising the friction between the valve seat surface and the pipe sealing faces of a valve disc, reducing operating torque required to bring said sealing faces together and allowing for the use of long life, fire rated, metal-to-metal seals.
2. A pressure balanced arrangement when closed: No fluid pressure contribution to initial actuation force/torque when the pressure differential across the valve is the greatest (closed position).
3. Providing a clear aperture when the valve is in the open position, allowing full bore flow, with no valve disc or faces remaining in the flow path. Thus providing an unimpeded full bore flow valve, akin to a ball or gate valve.

Aspects and/or embodiments seek to provide a valve for obturating a pipe, the valve having: a central axis X, a body having an inlet and an outlet, a body wall defining an aperture extending between the inlet and the outlet, a plurality of obturating portions for obturating said aperture, a valve mechanism connectable to an actuator, the plurality of obturating portions, moveable from a first closed position when the valve is closed to a second open position when the valve is open by the valve mechanism, the body wall including a valve seat for receiving the plurality of obturating portions, each obturating portion having a first end and a second end and a mid-section for sealing the aperture, the mid-section including a valve sealing face, for sealing to another of the obturating portions, and a pipe sealing face for sealing to the pipe. The valve may further comprise a plurality of first fixed pivot mounts on the body and wherein the first end of each obturating portion is pivotally mounted within a first fixed pivot mount. The valve may further comprise a plurality of second non-fixed pivot mounts connected to the valve mechanism and wherein the second end of each obturating portion is pivotally mounted within a second non-fixed pivot mount and wherein the valve mechanism and hence each second non-fixed pivot mount is movable in three dimensions between the first closed position and the second open position.

Preferably, the valve mechanism is configured to move the plurality of second non-fixed pivot mounts along axis X, and circumferentially about axis X, to cause the obturating portions to move radially, axially relative to and circumferentially about axis X from the first closed position to the second open position.

Preferably, each first fixed pivot mount including a first pivot having a first axis of rotation α and a second pivot having a second axis of rotation β and each second non-fixed pivot mount comprising a third pivot free to rotate around all three axes.

Preferably, each first fixed pivot mount comprising a third pivot free to rotate around all three axes and each second non-fixed pivot mount including a first pivot having a first axis of rotation α and a second pivot having a second axis of rotation β.

Preferably, the valve seat includes a circumferentially extending tapered valve seat surface. The tapered valve seat advantageously providing a seal and allowing a low or zero friction engagement of the valve seat surface by the pipe sealing faces of the obturating portions.

Preferably, the valve including a transverse plane C perpendicular to said axis X and further including, for each obturating portion, a longitudinal plane A, coincident with axis X and a first offset plane A' offset a distance D1 from said longitudinal plane A, wherein the first axis α is coincident with a first plane A'. The orientation of the axis α advantageously providing a low or zero friction engagement of the valve seat surface by the pipe sealing faces with no interference and a low or zero friction engagement of the respective valve sealing faces of the obturating portions again with no interference.

Preferably, wherein each obturating portion includes a first centre of pressure point P1 when the obturating portion is viewed in said transverse plane C with the valve in the closed position; and wherein the first plane A' rests on said first centre of pressure point P1.

When a first plane A' is coincident with the centre of pressure P1 of a respective obturating portion, advantageously the valve is in a pressure balanced state when in the closed position. Therefore, the valve may be opened and closed with low force even with high pressure flow within the pipe.

Preferably, wherein when in the closed position, each obturating portion includes a second centre of pressure point P2 when viewed in the longitudinal plane A and a third centre of pressure point P3 when viewed in the lateral plane B; and wherein the centre of pressure point P2 of each obturating portion is coincident with the respective axis α when viewed in its respective longitudinal plane A. Thus advantageously maintaining a pressure balanced condition when the valve is in the closed position.

Preferably, wherein when in the closed position each obturating portion includes a first centre of pressure point P1 when viewed in the transverse plane C, a second centre of pressure point P2 when viewed in the longitudinal plane A and a third centre of pressure point P3 when viewed in the lateral plane B, each centre of pressure point P1, P2, P3 having an associated force and an associated moment M1 M2 and M3 respectively, exerted on the respective obturating portion; and wherein each centre of pressure point P1 is offset from the respective axis α when viewed in the transverse plane C and each centre of pressure point P2 is offset from the respective axis α when viewed in the respective longitudinal plane A such that the associated moments M1, M2 act in opposite directions such that they cancel, resulting in a combined moment of zero. Thus advantageously maintaining a pressure balanced condition when the valve is in the closed position.

Preferably, wherein the third pivots of the respective obturating portions are located on the longitudinal plane A when in the closed position. The longitudinal plane A is perpendicular to the second axis β therefore the moment exerted by a force at centre of pressure point P3 has no effect and the valve is pressure balance in the closed position.

Preferably, the valve further including for each obturating portion a lateral plane B coincident with axis X and perpendicular to longitudinal plane A;

wherein, when the valve is in the closed position, the second axis β is coincident with a second offset plane B' offset a distance D2 from lateral plane B. The orientation of each respective plane B and thus each plane B' perpendicular to the respective plane A and therefore axis of rotation β of the second pivot ensures initial movement of the obturating portions on opening of the valve is mostly or is limited to rotation about the first pivot advantageously allowing the low or no friction engagement of the various sealing surfaces free from interference described above whilst allowing the obturating portions to rotate clear of the bore when in the open position.

Preferably, the valve further including for each obturating portion a lateral plane B coincident with axis X and perpendicular to longitudinal plane A and each pipe sealing face having a first end on the side of the longitudinal plane A having the centre of pressure of a respective obturating portion 30 and a second end on the opposite side of the longitudinal plane A to the first end;

wherein the first axis of rotation α of a respective obturating portion intersects the lateral plane B associated with said respective obturating portion in a region R bounded by a first line F and a second line G;

the first line F extending along said lateral plane B perpendicular to the surface of the seat sealing face at the point the valve seat intersects said lateral plane B on a first side of the Longitudinal plane A; and the second line G extending along said lateral plane B perpendicular to a line projected onto the lateral plane B from the valve seat surface at the point the second end sits when in the closed position.

Location of the axis α advantageously provides the three benefits described above.

Preferably, wherein the valve seat has a first end proximal the valve mechanism and a second end distal the valve mechanism and transverse plane C is coincident with the second end of the valve seat; and second axis β intersects the longitudinal plane A of the respective obturating portion on the opposite side of plane C to the valve mechanism. Advantageously ensuring no interference between the obturating portions when the valve opens.

Preferably, wherein a third line H extends along the longitudinal plane A of a respective obturating portion perpendicular to the valve seat surface at the point the valve seat intersects the longitudinal plane A; and the second axis β intersects the longitudinal plane A in a region S bounded by the transverse plane C and the third line H. Advantageously providing no interference between the obturating portions and the valve seat surface on engagement.

Preferably, wherein the second non-fixed pivot mount is located radially from axis X outside of the seat. Advantageously causing the obturating portion to rotate clear of the aperture when in the open position allowing full bore flow.

Preferably, wherein the third pivot comprises a spherical joint. Which advantageously provides rotation in three axes in a compact arrangement.

Preferably, wherein each first pivot is connected to its respective second pivot by a linkage; the linkage is connected to the body or the valve mechanism by the first pivot and the linkage is connected to the respective obturating portion by the second pivot.

Preferably, wherein the first axis α and the second axis β intersect.

Preferably, wherein the linkage includes a first end and a second end separated by a length L; and the first pivot is located at the first end of the linkage and the second pivot is at the second end of the linkage, such that the first axis α is offset from the second axis β by said length L. The linkage advantageously allows the first pivot and the second pivot to be offset to allow seating internal to a tapered seat surface. In particular the offset provided by length L provides a low or no friction engagement between the respective valve seat surface and the valve and pipe sealing faces when regions S and R are not over lapping.

Preferably, wherein there are n obturating portions each comprising one or more valve sealing faces, including a first valve sealing face extending from the axis X radially towards the first fixed pivot mounting and a second valve sealing face extending radially from axis X an angle of 360/n to the first valve sealing face. The angle of the first valve sealing face to the second valve sealing face at the axis X allows the obturating portions to tesselate and provide a seal within the valve seat.

Preferably, wherein the one or more valve sealing faces are parallel to axis X. Advantageously, allowing the valve sealing faces to come together without friction or interference in an embodiment with two obturating portions.

Preferably, wherein the pipe sealing face is tapered to match the valve seat surface. The matched taper angle advantageously providing a seal.

Preferably, wherein a portion of each first valve sealing face proximal the valve seat extends away from longitudinal plane A on the opposite side of the longitudinal plane A to the centre of pressure P. Preferably, wherein a portion of the second valve sealing face proximal the valve seat extends away from longitudinal plane A on the same side of the longitudinal plane A to the centre of pressure P. The complementary arrangement of the first and second valve sealing faces extending away from either side of their respective planes A advantageously provides a clear bore when the obturating portions are in the open position and provides no interference between the obturating portions and the valve seat.

Preferably, wherein the valve seat surface is divided into one or more flat valve seat portions.

Preferably, wherein said valve seat surface is at an angle ε less than 90 Degrees to the axis X. Allowing a low or no friction between the sealing faces on closure and opening of the valve.

Preferably, wherein the one or more valve sealing faces are offset in first direction along axis X and connected to the pipe sealing face by intermediate sealing faces to form a continuous seal about the obturating portion.

Preferably, wherein the valve sealing faces include a chamfered lower edge for clearance between the plurality of obturation portions when moving from the first closed position to the second open position. The chamfered lower edge and corresponding offset location of the seal provide clearance for the motion of the obturating portions whilst maintaining valve sealing faces that meet with no interference and low or no friction.

Preferably, wherein the valve mechanism includes a control ring comprising the plurality of second non-fixed pivot mounts for connecting the plurality of obturating portions to the control ring. The control ring advantageously maintains the relative location of the second non fixed pivot mounts and includes a central aperture that does not interfere with the central aperture of the valve.

Preferably, wherein the body includes a control ring guide for limiting the motion of the control ring to translation along axis X and rotation about axis X.

Preferably, wherein the control ring includes an engagement means for engaging an actuator.

Preferably, wherein the body wall is continuous with no apertures except the inlet and the outlet.

Preferably, the valve further comprising one or more actuators for moving the control ring.

The continuous body wall advantageously removing the possible failure point of a seal.

Preferably, wherein the one or more actuators include a magnetic coupling. The magnetic coupling enabling drive from the actuator to pass through a continuous body wall to drive the valve mechanism.

Preferably, wherein the inlet and the outlet comprise a flanged, threaded or welded pipe connection. Alternatively any secure fluid tight connection can be used. Said pipe connection providing a sealed connection between the inlet and outlet of the valve and the pipe to which it is fitted.

BRIEF DESCRIPTION OF DRAWINGS

Embodiments will now be described, by way of example only and with reference to the accompanying drawings having like-reference numerals, in which:

FIG. 1a shows a Zero offset butterfly valve of the prior art, specifically a section view, with detail showing required interference between the valve face/disc and the seat; with dashed lines showing face/disc in open position;

FIG. 1b is a front view of the valve of FIG. 1a;

FIG. 2a shows a section view of a Double offset butterfly valve of the prior art, wherein the dotted region shows suitable location for shaft axis to avoid contact between the valve face/disc and valve seat when opening; with dashed lines showing face/disc in open position;

FIG. 2b shows a front view of the valve of FIG. 2a;

FIG. 3a shows a section view of a triple offset butterfly valve of the prior art, wherein the dotted region shows suitable location for shaft axis to avoid contact between valve face/disc and the valve seat when opening; the dashed lines show the valve face/disc in the open position;

FIG. 3b shows a front view of the valve of FIG. 3a;

FIG. 4a shows a representation of key mechanisms which form the disclosed embodiment with the body removed to provide a clear view; FIG. 4b shows the valve of FIG. 4a further including a quarter section of a valve body, having flanged pipe connections as an example of how the valve may interface with joining pipe work; a magnetic coupling and actuator (sectioned) are also included;

FIG. 5b shows the valve of FIG. 5a further including a quarter section of a valve body, having flanged pipe connections as an example of how the valve may interface with joining pipe work; a magnetic coupling and actuator (sectioned) are also included;

FIG. 9 shows the valve of FIG. 4a and FIG. 4b the current invention in closed position, showing in FIG. 9a a pictorial view; FIG. 9b back view; FIG. 9c top section view.

FIG. 10 shows the valve of FIG. 4a and FIG. 4b the current invention in position where the control ring is rotated 3% towards open position and including details showing clearance between faces and between face and seat when opening, showing in FIG. 10a a back view; FIG. 10b pictorial view; FIG. 10c top section view;

FIG. 13 shows an alternative embodiment of the valve according to the current invention with 8 obturating portions, where axis α and β intersect; showing in FIG. 13a a section side view.

SPECIFIC DESCRIPTION

Figures 1A, 1B:
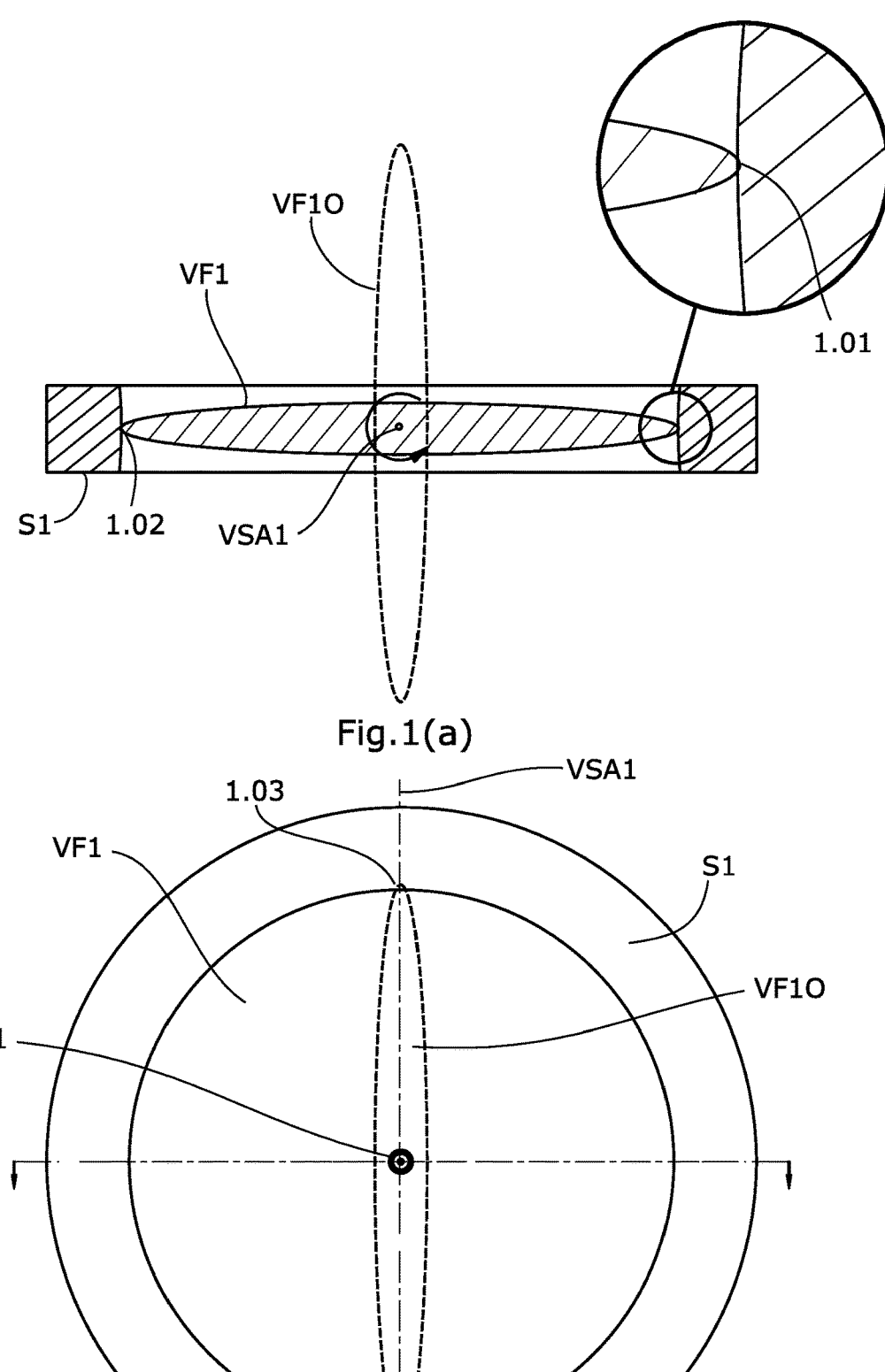
Figures 2A, 2B:
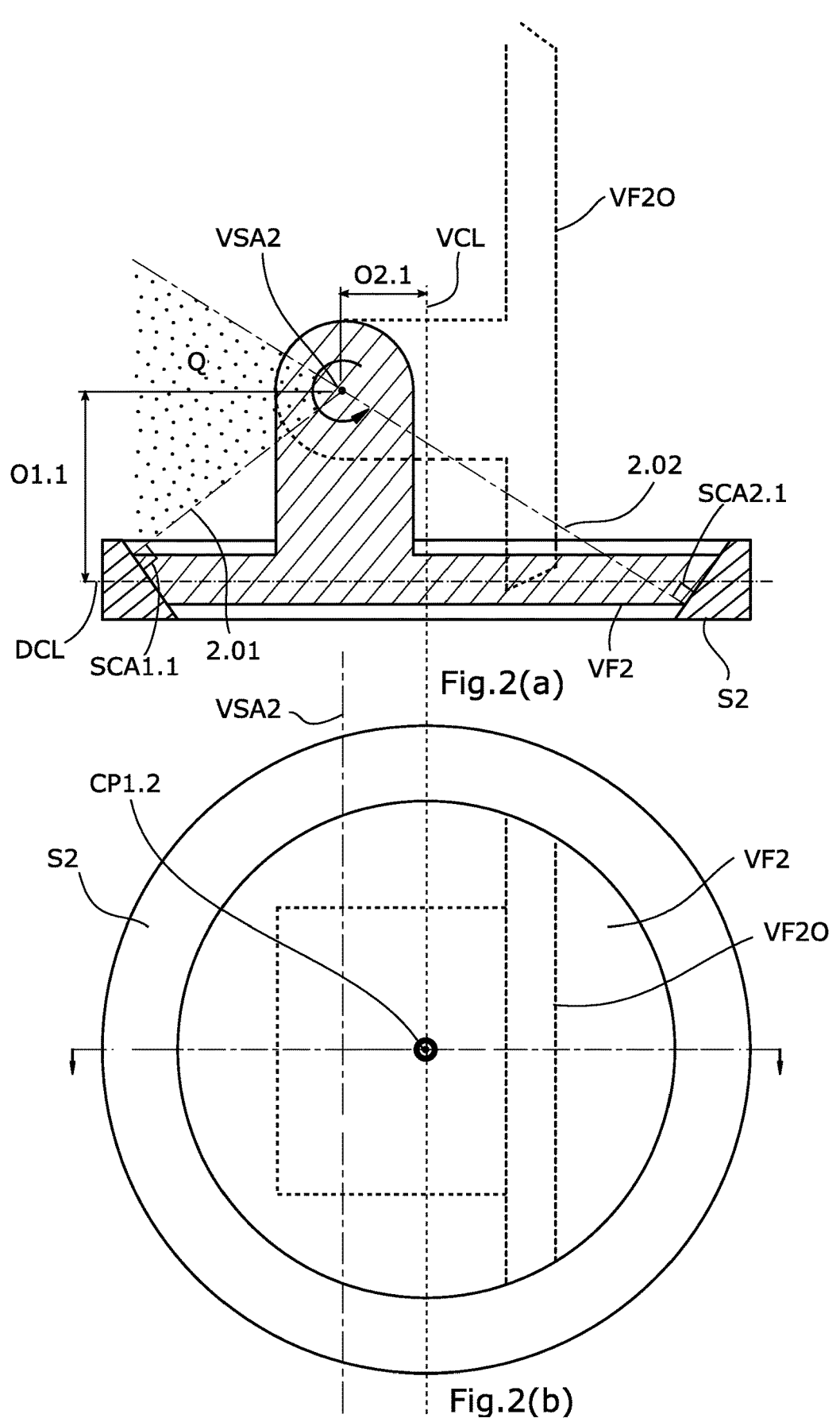
Figures 3A, 3B:
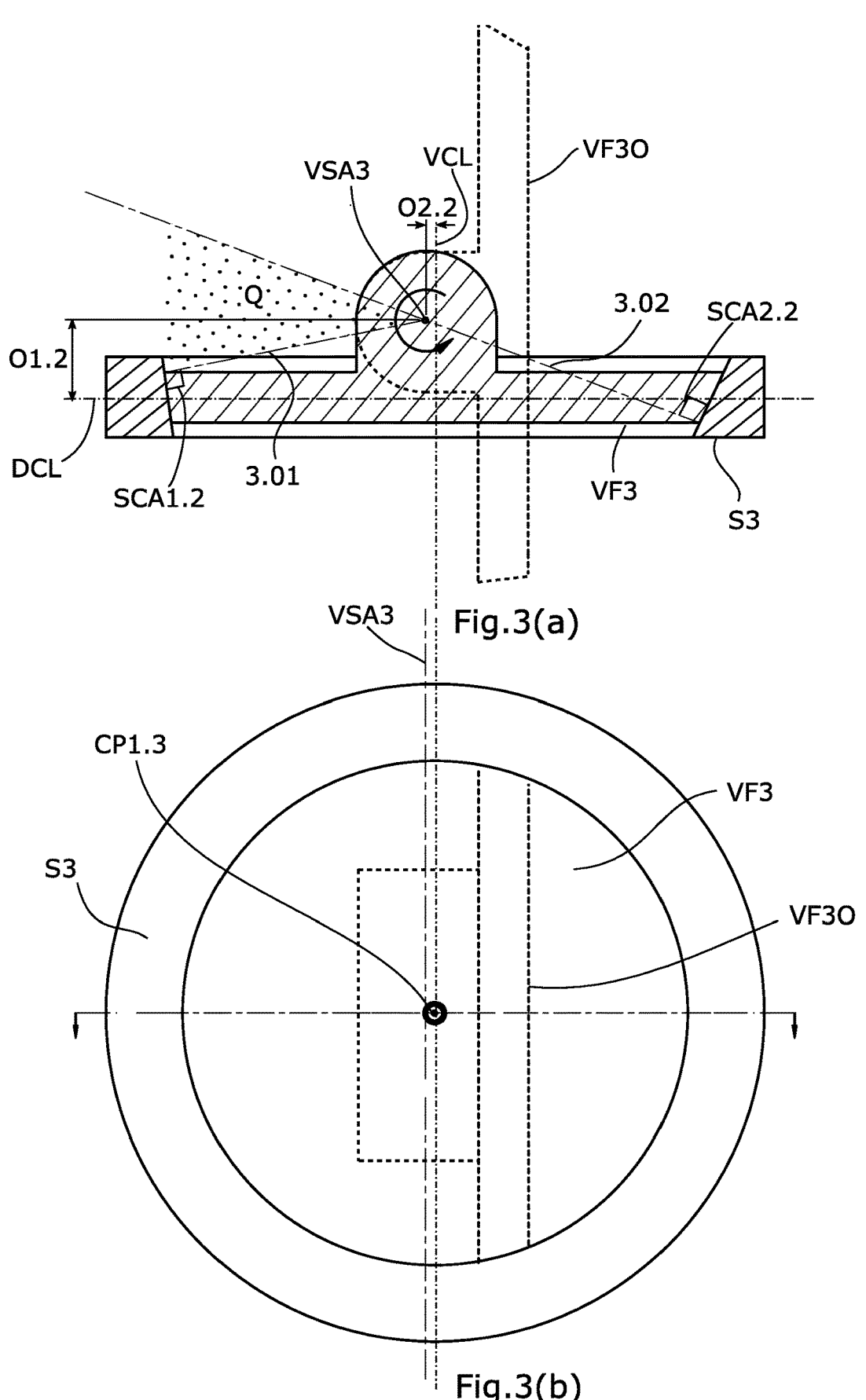
Figure 4A:
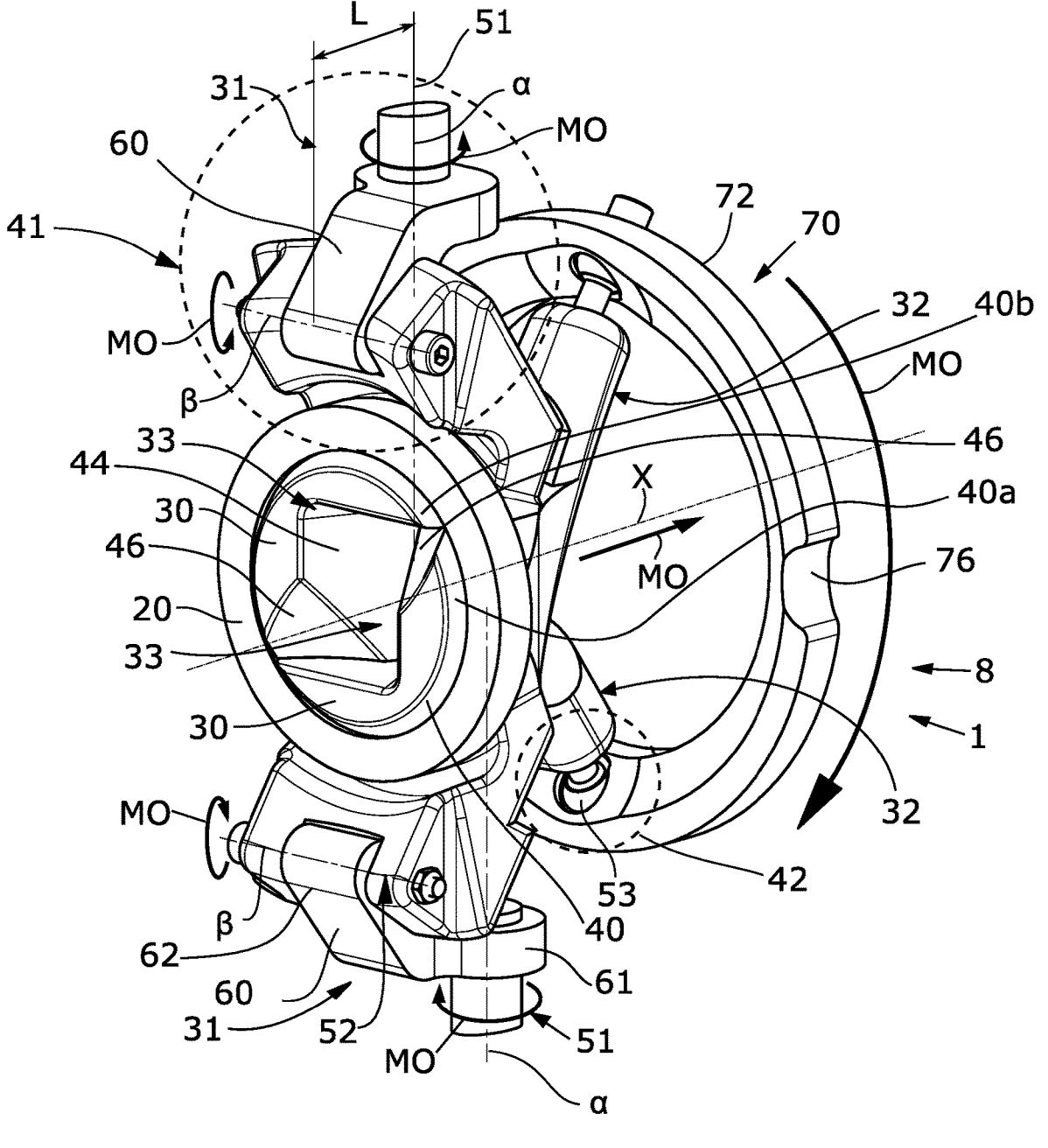
FIG. 4a and FIG. 4b show a valve according to the current invention in closed position.
Figure 4B:
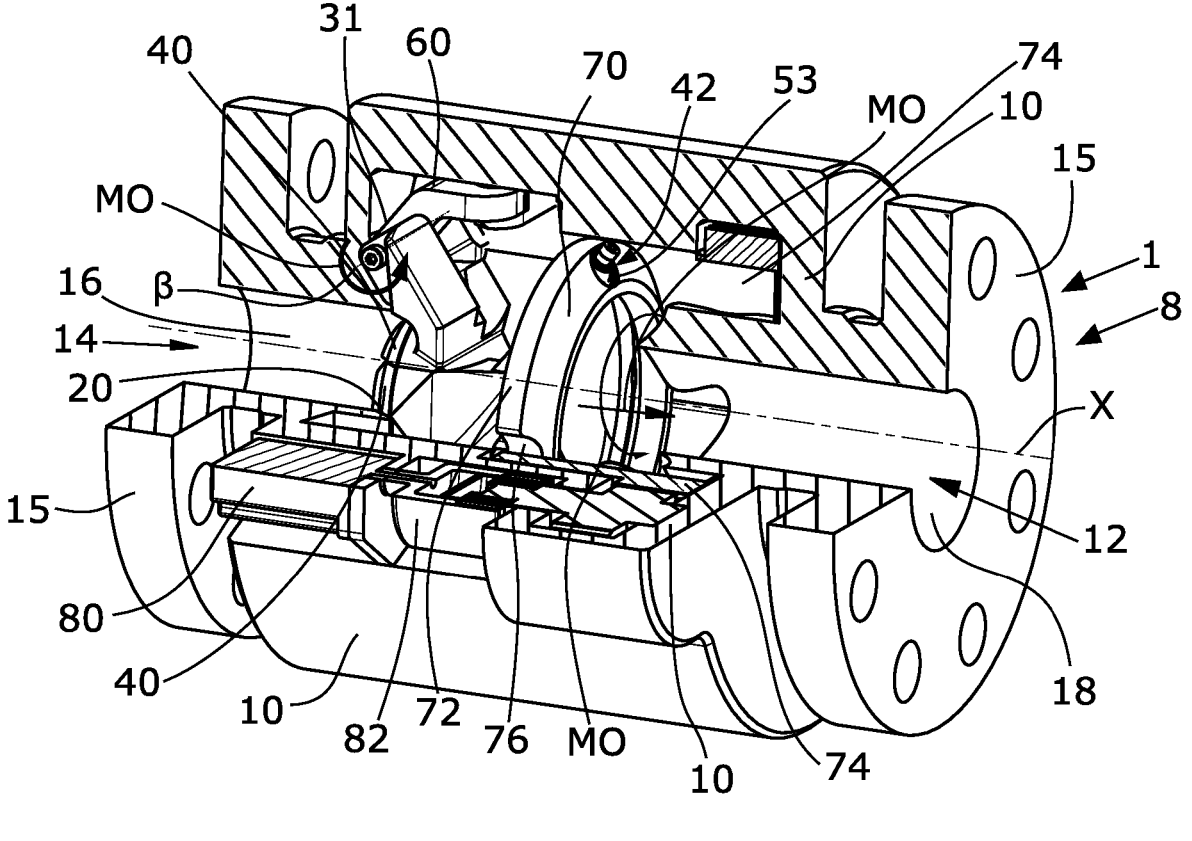

Referring to FIG. 4a and FIG. 4b, together FIG. 4, a preferred embodiment of the current invention will now be described. FIG. 4a shows a valve 1 for obturating a pipe, having a central axis X. The valve comprises a plurality of obturating portions 30, a valve mechanism 70, a body 10 including a body wall 16, a valve seat 20, an inlet 12, and an outlet 14. The body wall 16, inlet 12, and outlet 14 are not shown in FIG. 4a leaving the obturating portions 30, the valve seat 20 and the valve mechanism 70 visible. In addition to the features shown in FIG. 4a, FIG. 4b shows the inlet 12 and an outlet 14 each having a bore and a bore centre comprising part of an aperture 18 extending between the inlet 12 and outlet 14 through the valve seat 20. The central axis X joins the bore centre of the inlet 12 and the outlet 14. The body wall 16 including the valve seat 20 defines a portion of the aperture 18 which extends from the inlet 12 to the outlet 14 of the valve 1. Preferably the aperture 18 is the only aperture at the valve seat 20. The valve 1 is in the closed position 8 with the plurality of obturating portions 30 obturating the aperture 18 at the valve seat 20. FIG. 4b shows the complete valve in the same position as FIG. 4a with the addition of a quarter section view of the body wall 16, the inlet 12, outlet 14 and valve mechanism 70. The obturating portions 30 and the valve mechanism are movable from a closed position 8 where they block the flow through the valve 1, to an open position 9 where the obturating portions 30 clear of the aperture 18 and thus out of the flow stream passing down said aperture 18. Both FIGS. 4a and 4b include arrows labelled MO showing the motion of the components when the valve moves from the closed position 8 to the open position 9.

FIG. 4a shows an embodiment of the valve 1 with two obturating portions 30, the valve seat 20 of the body 10 and part of the valve mechanism 70. Each obturating portion 30 has a first end 31 and a second end 32 and a mid-section 33. As the valve 1 is in the closed position 8 the mid sections 33 of the obturating portions 30 are obturating or sealing the aperture 18 defined by the valve seat 20 of the body 10.

The valve 1 includes a plurality of first fixed pivot mounts 41 on the body 10. Each obturating portion 30 is pivotally mounted to the valve body 10 (not shown in FIG. 4*a*) at its respective first end 31 by the first fixed pivot mount 41. Each first fixed pivot mount 41 is fixed in that it is attached to the body 10 of the valve 1, which can be considered stationary and therefore at least a portion of the fixed pivot mount 41 is constrained such that it may not translate in any direction, relative to the body 10, when the valve 1 is actuated causing the valve 1 and thus the obturating portions 30 to move from a first closed position 8 to a second open position 9 or from the second open position 9 to the closed position 8.

The valve 1 includes a plurality of second non-fixed pivot mounts 42 connected to the valve mechanism 70. Each second end 32 of the obturating portion 30 is pivotally mounted to the valve mechanism 70 at the second non-fixed pivot mount 42. Each second non-fixed pivot mount 42 is non-fixed in that each second non fixed pivot mount 42 and thus the second end 32 of the obturating portion 30 and the part of the valve mechanism 70 to which the obturating portion 30 is connected by the second non fixed pivot mount 42 may translate in three dimensions along a path controlled by the valve mechanism 70 between the first closed position 8 and the second open position 9. In FIG. 4*a* it can be seen that the valve mechanism 70 includes a control ring 72 and the plurality of second non-fixed pivot mounts 42 pivotally connect the second end 32 of each obturating portion 30 to said control ring 72. In a preferred embodiment the control ring 72 comprises the plurality of second non-fixed prior mounts 42. In this embodiment all the second ends 32 of the obturating portions 30 are joined to and constrained to move together by the control ring 72. The control ring 72 is constrained by a control ring guide 76 to move axially along axis X and rotate about axis X thus causing the second non-fixed pivot 42 to move axially along axis X and rotate circumferentially about axis X. This causes the obturating portions 30 to move radially, axially relative to axis X and circumferentially about axis X from the first closed position 8 to the second open position 9. Therefore, the valve mechanism 70 and hence each second non-fixed pivot mount 42 is movable in three dimensions between the first closed position 8 and the second open position 9.

The valve mechanism 70 is connectable to an actuator 80 by an engagement means 74 for moving the valve mechanism 70 and thus the obturating portions 30 from the closed position 8 to the open position 9. Said engagement means 74 may be included as part of the control ring 72 and the actuator 80 may act to rotate the control ring 72 to open or close the valve 1. The valve may include said actuator 80. The actuator 80 may comprise one or more electrical, hydraulic, pneumatic or other suitable actuators 80. In a preferred embodiment the engagement means 74 and/or actuator 80 includes a magnetic coupling 82. If a magnetic coupling 82 is present the body wall may be continuous with no apertures except for the inlet 12 or the outlet 14 reducing the number of seals compared to the prior art.

Each first fixed pivot mount 41 includes a first pivot 51 having a first axis of rotation α and a second pivot 52 having a second axis of rotation β. Each first pivot 51 and the second pivot 52 are joined by a linkage 60. The linkage has a first end 61 and a second end 62 separated by a length L. The first end 61 of the linkage 60 is connected to the body

10 by the first pivot 51 of the first fixed pivot mount 41 and the second end 62 of the linkage 60 is attached to the first end 31 of the obturating portion 30 by the second pivot 52 and thus the first axis of rotation α and the second axis of rotation β are separated by length L. Each linkage 60 may offset the first pivot 51 axially, radially or circumferentially from the second pivot 52 of the respective first fixed pivot mount 41 when in the closed position.

Each second pivot mount 42 includes a third pivot 53 which is free to rotate in all three axes. In the preferred embodiment of FIG. 4*a* the third pivot 53 is a spherical joint but other suitable joints may be used.

FIG. 4*b* shows the same embodiment of the valve 1 of the current invention with the addition of further sections of the body 10. The inlet 12 and the outlet 14 can be seen. Each of the inlet and the outlet including a flanged pipe connection 15. FIG. 4*b* further includes an electric motor actuator 80, magnetic coupling 82, a control ring guide 74 and engagement means 76 depicted with quarter section removed.

Figure 5A:
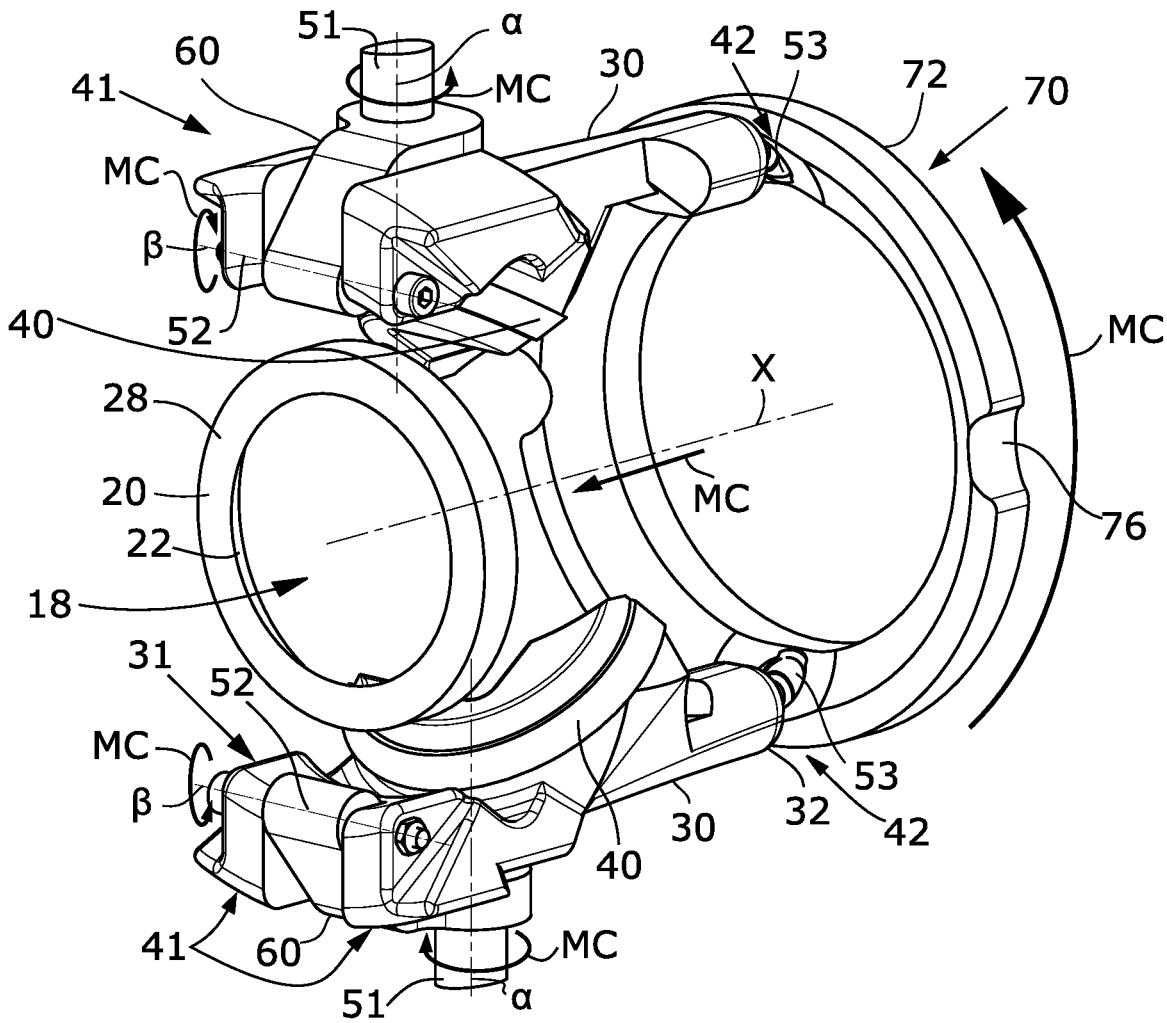
FIG. 5a and FIG. 5b show the valve of FIG. 4a and FIG. 4b in an open position.
Figure 5B:
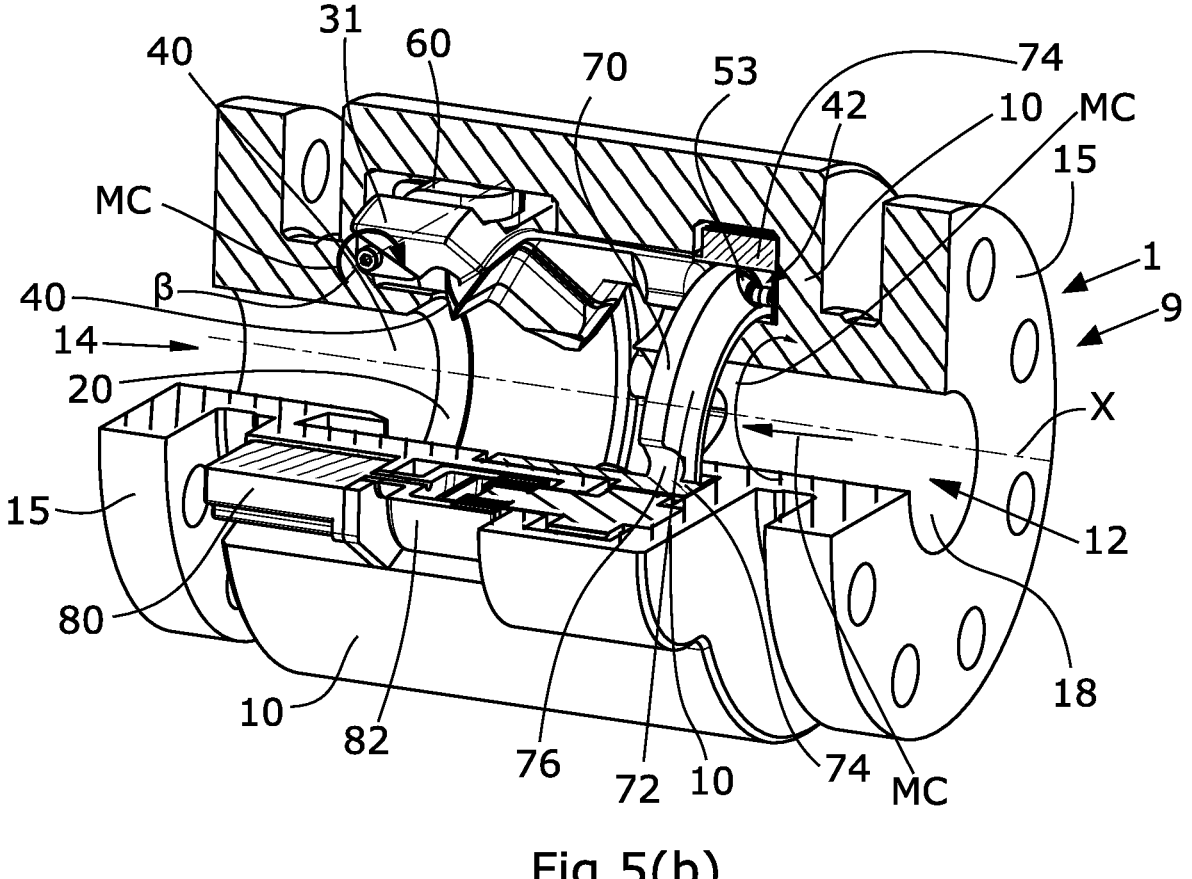

FIGS. 5*a* and 5*b*, together FIG. 5, show the same components as FIGS. 4*a* and 4*b*, respectively with the valve 1 and thus the obturating portions 30 and the valve mechanism 70 in the open position 9. Both FIGS. 5*a* and 5*b* include arrows labelled MC showing the motion of the components when the valve moves from the open position 9 to the closed position 8.

FIG. 5*a* shows the mid-section 33 of the obturating portions 30 including a pipe sealing face 40 for sealing each obturating portion 30 to the valve seat 20. FIG. 5*b* shows the mid-section 33 of the obturating portions 30 including a first valve sealing face 38 for sealing each obturating portion 30 to another obturating portion 30. The valve sealing face 38 of each obturating portion 30 is sheer and parallel with axis X to allow a seal with a valve sealing face 38 of another obturating portion 30. The valve seat 20 is also shown including a radially extending, tapered valve seat surface 22. The pipe sealing face 40 of each obturating portion 30 is tapered to match the tapered valve seat surface 22 to provide a seal. In a preferred embodiment the valve seat surface 22 is at an angle ε at less than 90 degrees to the X axis, in a further embodiment the valve seat surface 22 is angled at less than 88 degrees to the X axis.

To move between the closed position 8 shown in FIG. 4 and the open position shown in FIG. 5 the valve mechanism 70 has caused the control ring 72 to translate along axis X and rotate about axis X in the directions of the arrows MO in FIG. 4. The plurality of obturating portions 30 have moved from a first closed position 8 when the valve is closed to the second open position 9 when the valve is open by the valve mechanism 70. Therefore, the obturating portions 30 that extended across the aperture 18 in the closed position 8 have moved radially and axially relative to axis X and circumferentially about axis X from the first closed position 8 to the second open position 9. in the second open position 9 the first end 31 and second end 32 of each obturating portion 30 sit axially along the same side of the aperture 18. In the preferred embodiment shown the rotation of the control ring of the valve mechanism is greater than 170 degrees and in alternative embodiments may be between 60 and 180 degrees. Therefore, leaving the aperture 18 clear of obstruction allowing free flow of fluid through the valve 1 when in the open position 9.

It will be understood that whilst this embodiment shown in FIGS. 4 and 5 includes 2 obturating portions 30 any plurality of obturating portions 30 can be used in the current invention. The linkage 60 shown has a length L between the first and second ends 61, 62 however in alternative embodiments the length L may be reduced or tend to zero and first axis of rotation α and the second axis of rotation β may intersect. In alternative embodiments the first fixed pivot mount 41 may comprise the third pivot 53 and the second non-fixed pivot mount 42 may comprise the first pivot 51, the second pivot 52 and the linkage 60 with the same functionality. A flanged pipe connection 15 is shown but the skilled person will understand that a flanged, threaded, welded or other suitable pipe connection 15 may be used. Whist the terms inlet 12 and outlet 14 are used to denote the points fluid enters and exits the valve 1 it will be understood that the valve is bi-directional and the terms inlet 12 and outlet 14 are interchangeable depending on the direction of fluid flow. In some embodiments there may be bypass apertures in the body 10 for allowing a controlled quantity of flow around the seat 20 when the valve 1 is in the closed position 8 in addition to aperture 18. In the preferred embodiment shown in FIGS. 4 and 5 having two obturating portions 30 at least a portion of the valve sealing face 38 of each obturating portion is parallel with the axis X when in the closed position 8. In alternative embodiments having greater than 2 obturating portions the valve sealing face 38 may be at an angle to the axis X as the valve sealing faces will move axially in opposite directions when the valve opens. Whist the preferred embodiment described has a tapered valve seat 20 with a single conical valve sealing surface 22, any profile of valve seat can be used, e.g. hexagonal or octagonal instead of circular.

Figures 6A, 6B:
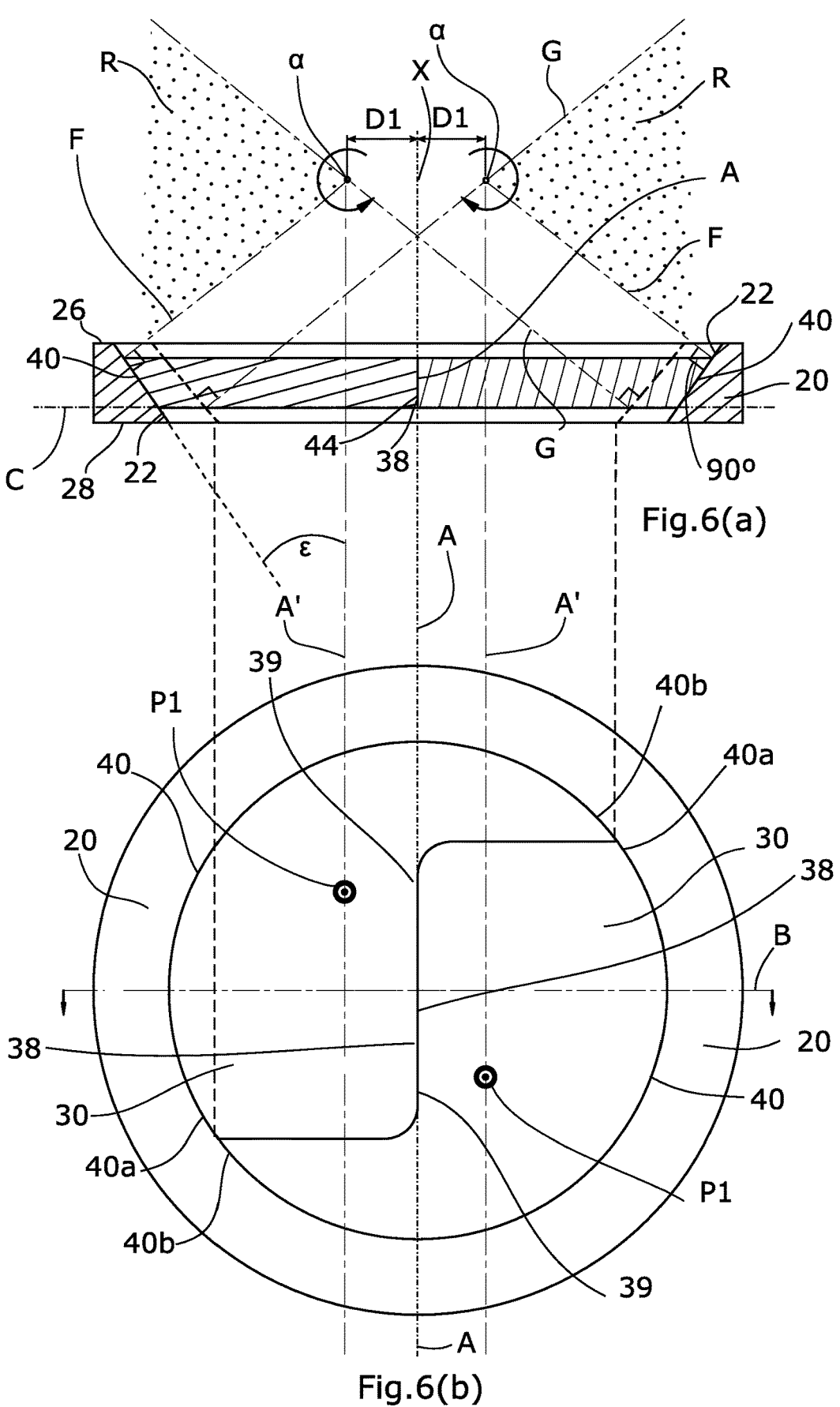
FIG. 6a and FIG. 6b show a schematic concept view of a pressure balanced valve according to the current invention.

Referring to FIGS. 6a and 6b, together FIG. 6, a schematic of the current invention will now be described to illustrate the orientation and location of features of the valve 1. FIG. 6a shows a cross section view through the central axis X, perpendicular to the valve sealing faces 40 of the obturating portions 30 at the central axis X, of the valve seat 20 and the mid-section 33 of a pair of obturating portions 30. FIG. 6b shows the arrangement of the components of FIG. 6a looking along axis X from the opposite side of the valve seat 20 to the valve mechanism 70.

For each obturating portion 30 the valve 1 includes a longitudinal plane A and a lateral plane B. Each longitudinal plane A is coincident with axis X and the longitudinal planes A may be equispaced radially about the axis X. Each lateral plane B is coincident with axis X and perpendicular to longitudinal plane A of the respective obturating portion 30. Therefore, planes B may also be equispaced around axis X. The longitudinal planes A and lateral planes B of the two obturating portions 30 can be seen end on in FIG. 6b however the two planes A are coincident and the two planes B are coincident as there are two obturating portions 30 and therefore the two planes A and the two planes B are at 180 degrees to one another. The valve also has a transverse plane C perpendicular to the axis X. The valve seat 20 has a first side 26 proximal the valve mechanism 70 and a second side 28 distal the valve mechanism 70. The transverse plane C may be located on the second side 28 of the valve seat. The section of FIG. 6a is taken at a plane B.

FIG. 6 show the possible positions of axis α. Axis α, of a first pivot 51, associated with a particular obturating portion 30, is coincident with a first offset plane A' offset a distance D1 from plane A. Also shown is a centre of pressure point P1 at the centre of pressure placed on each obturating portion 30 when viewed in the transverse plane C, by the fluid in the pipe. The centre of pressure P1 may be at the centroid of the area presented by an obturating portion 30, in transverse plane C, to the fluid when in the closed position 8. In FIG. 6a the valve seat is on said transverse plane C.

The distance D1 can be used to control whether the valve is forced open by the pressure of the fluid flowing in the pipe, forced closed by the pressure of the fluid in the pipe or if the valve is pressure balanced. In the preferred arrangement displayed in FIG. 6 the distance D1 is equal to the distance from the longitudinal plane A to the centre of pressure therefore the centre of pressure is coincident with first offset plane A' and coincident with axis α. Therefore, there is no lever-arm and no moment exerted on the obturating portion 30 by the pressure of the fluid. If the distance D1 is greater or less than the distance of the point of the centre of pressure P1 from plane A, the force from the centre of pressure P1 will no longer act through the axis α and the obturating portion 30 will act as a lever arm and the fluid will exert a moment about axis α. If the distance D1 is greater than the distance between the plane A and the centre of pressure P1 the valve will be forced closed and if the distance D1 is less than the distance between plane A and the centre of pressure P1 the valve will be forced open by the pressure of the fluid.

FIG. 6b shows for each obturating portion 30 the pipe sealing face 40 having a first end 40a on the side of the longitudinal plane A having the centre of pressure of the respective sealing face and a second end 40b on the opposite side of the longitudinal plane A to the first end 40a.

FIG. 6a shows a region R on lateral plane B. Axis of rotation α of a respective obturating portion 30 preferably intersects the lateral plane B associated with said respective obturating portion in the region R. The region R is bounded by a first line F and a second line G. The first line F extends along the lateral plane B perpendicular to the surface of the seat sealing face 22 at the point the valve seat surface 22 intersects the lateral plane B on a first side of the Longitudinal plane A. The first side of the longitudinal plane A is the side having the centre of pressure of the respective obturating portion 30. The second line G extending along the lateral plane B perpendicular to a line projected onto the lateral plane B from the valve seat surface 22 at the point the furthest extent of the second end 40b sits when in the closed position 8. By the axis α intersecting the lateral plane B in region R the pipe sealing face 40 does not interfere with the valve sealing face 22 when moving from or to the closed position 8.

Figures 7A, 7B:
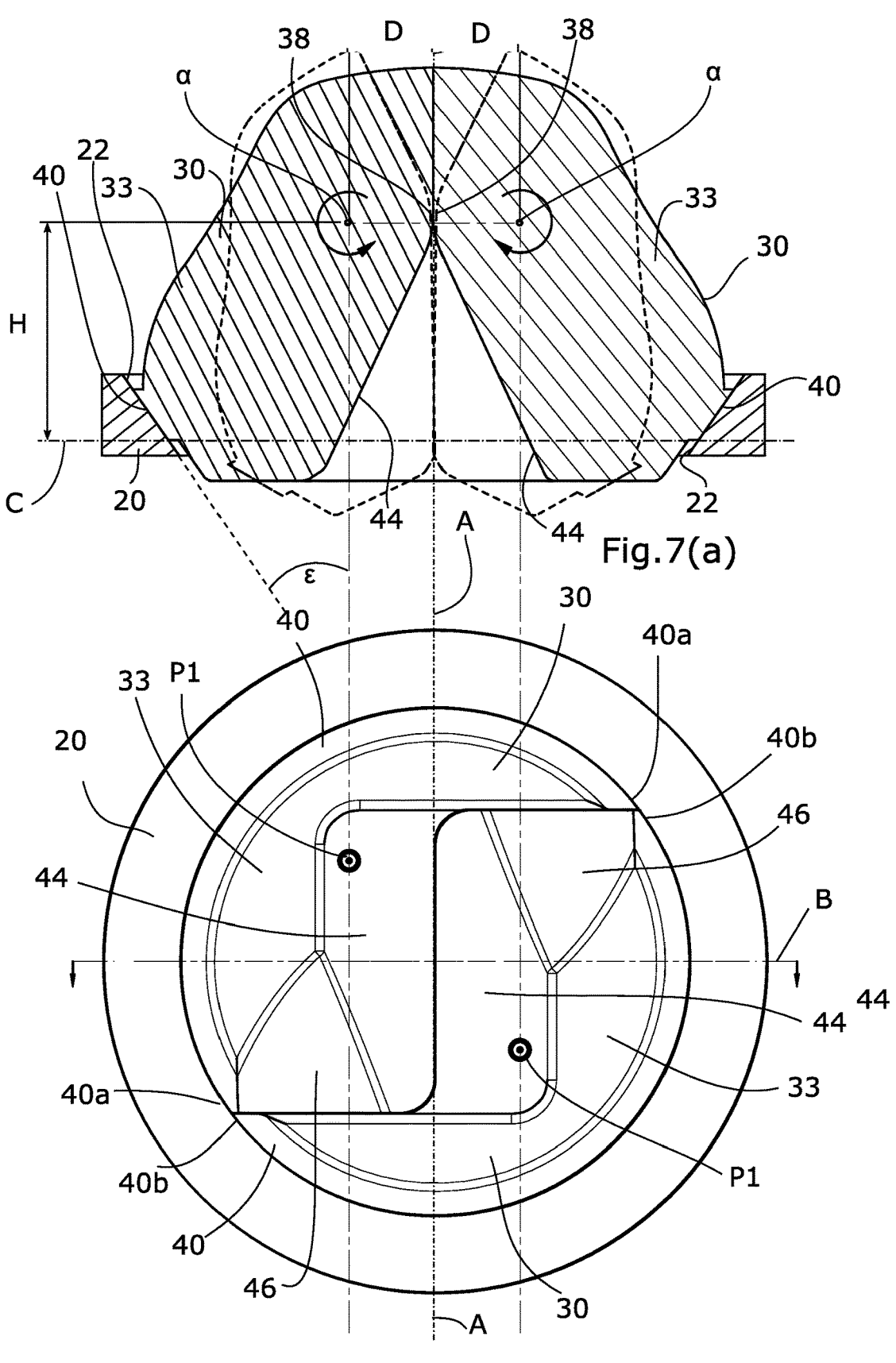
FIG. 7a and FIG. 7b show a schematic concept view of pressure balanced valve by splitting the valve face/disc into a plurality of obturating portions.

It can be seen in the schematic of FIG. 6 that the lower edge 44 of the valve sealing faces 38 as viewed in FIG. 6a are coincident with one another. The lower edge 44 of the valve sealing faces 38 is the edge on the opposite side to the valve mechanism 70. Therefore, if the obturating portions are to rotate in the direction shown about axis α as they do when the valve 1 is actuated the valve sealing faces 38 will interfere. This would require the valve 1 to jam and/or require deformable sealing faces, resulting in high wear and a less efficient seal. FIG. 7a and FIG. 7b, together FIG. 7 show a pictorial view of the features included in the schematic of FIG. 6, according to the current invention, which enables the valve to move from the closed position 8 to the open position 9 without scrubbing or interfering with the various valve sealing faces 38 and allowing the valve 1 to open without the pipe sealing faces 40 interfering with the valve seat surface 22. Therefore, the lower edge 44 of the valve sealing surface is chamfered to prevent interference. This requires the valve sealing face 38 to be offset in a first direction along axis X. The first direction is towards the valve mechanism 70. To maintain a seal the mid portion 33 of each obturating portion 30 further includes an intermediate sealing face 37 extending between the pipe sealing face 40 and the valve sealing faces 38 to provide, continuous sealing faces 37, 38, 39, 40 about the obturating portion 30 perimeter allowing the plurality of obturating portions 30 to create a seal within the valve seat 20 when in the closed position 8.

Thus each obturating portion 30 is constrained to move not only around single axis or translate in a single plane as in the prior art but are instead constrained at one end to rotate around a first axis $\alpha$ and a second axis $\beta$ which lie in a plane A' and a plane B' normal to each other. Although the first axis $\alpha$ and second axis $\beta$ do not have to be normal to each other. The other end of the obturating portion is constrained to rotate around all three axes for example at a spherical ball joint.

Figures 8A, 8B:
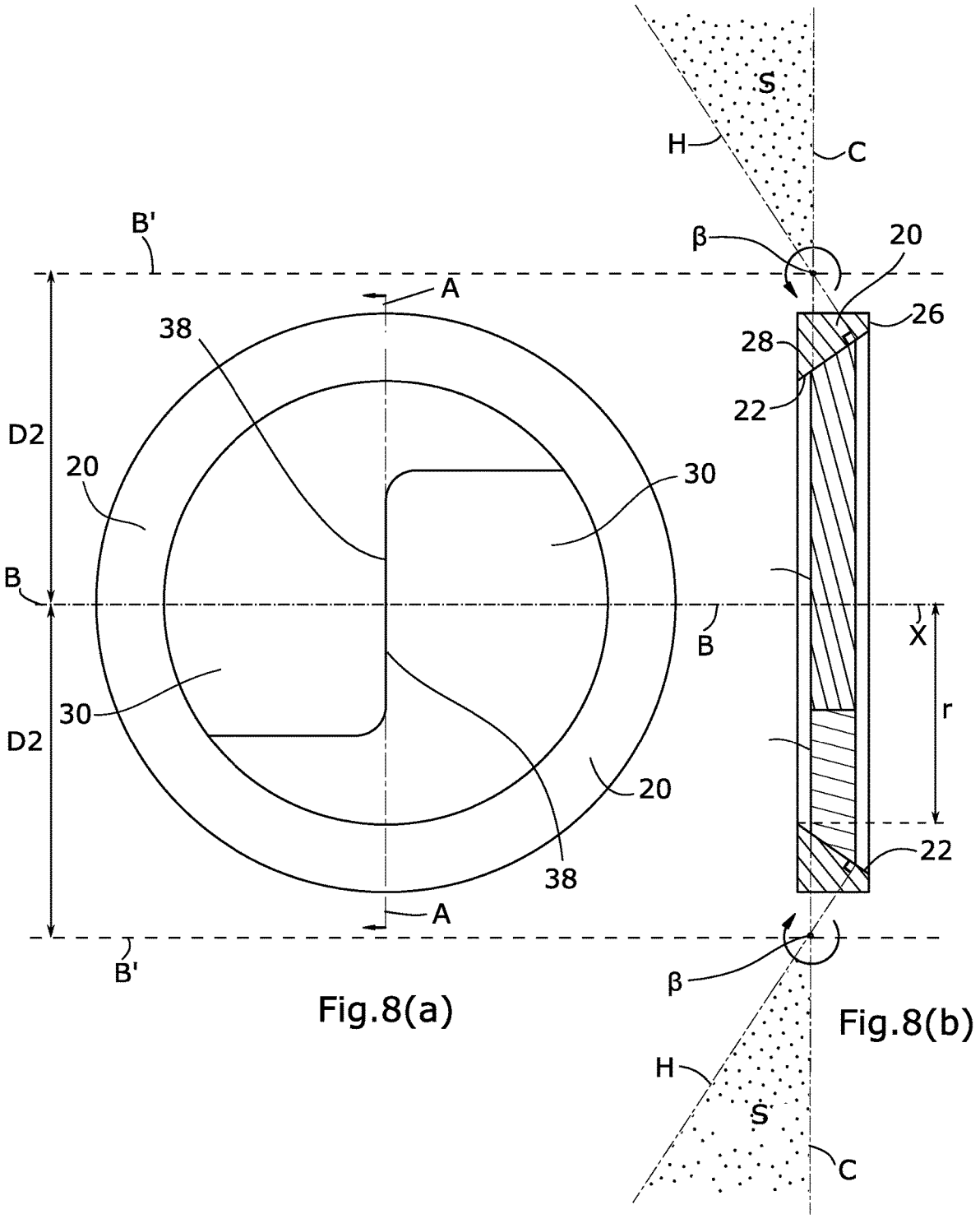
FIG. 8a and FIG. 8b show a schematic concept view of a pressure balanced valve according to the current invention.

FIG. 8a shows a schematic view of the valve seat 20 and two obturating portions 30 viewed from the side of the valve 1 distal from the valve mechanism 70. The plane of the cross-section view of FIG. 8b is also shown; this plane is plane A of the respective obturating portions 30. Plane B of the obturating portions is also shown both planes are viewed end on. A plane B' is offset a distance D2 from each of the respective planes B of the two obturating portions 30. The distance D2 is greater than or equal to the radius r of the valve seat surface 22 from axis X. Preferably the radius r is taken at the second end 28 or narrower end of the valve seat 20.

FIG. 8b shows a cross section schematic view of the components displayed in FIG. 8a and the location of the transverse plane C on the second side 28 of the valve seat 20 distal to the valve mechanism 70. Preferably the axis $\beta$ associated with each obturating portion 30 intersects the respective longitudinal plane A on the side of the transverse plane C distal to the valve mechanism 70. The axis $\beta$ may intersect longitudinal plan A at a distance D3 from the transverse plane C where D3 is greater than zero. A line H extends perpendicular to the valve seat surface 22 away from central axis X, defining a region S on plane A at which it is preferable that a respective axis $\beta$ intersects the longitudinal plane A of the respective obturating portion 30. For clarity in FIG. 8 the obturating portion 30 displayed on the right side of FIG. 8a is associated with the second axis $\beta$ shown at the bottom of FIG. 8b.

It can be seen in FIG. 4, and FIGS. 5 to 8 discussed above which all show the valve 1 and thus the obturating portions 30 in the first closed position 8. A first valve sealing face 38 of each obturating portion 30 is shown extending radially from axis X. The embodiment shown in these figures has two obturating portions 30 however any plurality of obturating portions 30 are possible in the current invention. FIGS. 12 and 13 show embodiments of the current invention with 8 and 3 obturating portions respectively. For an embodiment of the current invention having n obturating portions a second valve sealing face 39 will extend from axis X at an angle of 360/n degrees to the first valve sealing face 38. In the preferred embodiment of FIG. 4 the first valve sealing face 38 of each obturating portion 30 extends along its respective longitudinal plane A toward the respective first fixed pivot mount 41, however, it will be understood that in alternative embodiments the first valve sealing face may only extend substantially toward the first fixed pivot mount and not be coincident with longitudinal plane A. It is preferable that the obturating portions 30 have valve sealing faces 38, 39 equispaced about the central axis X. Said valve sealing faces 38, 39 must also tesselate when in the closed position 8 to provide a seal.

FIG. 4, and FIGS. 5 to 8 also show an embodiment wherein a portion of the first valve sealing face 38 proximal the valve seat 20 of each obturating portion 30 extends away from the longitudinal plane A on the opposite side to the centre of pressure P1 of the respective obturating portion 30. Correspondingly, to allow the plurality of obturating portions 30 to tesselate each obturating portion 30 includes a portion of the second valve sealing face 39 proximal the valve seat 20 that extends away from the respective longitudinal plane A on the same side of said longitudinal plane A as the obturating portions 30 centre of pressure P.

When in the open position 9 the valve 1 provides a clear unobstructed aperture 18 extending though the valve 1. To allow this there is a bore clearance cut out 46 on the mid-section 33 of each obturating portion which can be seen on FIG. 7b.

The movement of the invention between the first closed position 8 and the second position 9 will now be described with reference to FIGS. 9 to 11. These figures show the valve seat 20 the obturating portions 30 and the valve mechanism 70 as they progress through the movement from the first closed position 8 to the second open position 9. To move from the closed position 8 to the open position 9 the second ends 32 of the obturating portions 30 translate 180 degrees circumferentially about the central axis X controlled by the valve mechanism 70. The second ends 32 are pivotally mounted to the control ring 72 of the valve mechanism 70 at the second non-fixed pivot mount 42. The control ring 72 is the component in the valve mechanism 70 that rotates about axis X and causes the second ends 32 to translate circumferentially about Axis X.

Figures 9A, 9B, 9C:
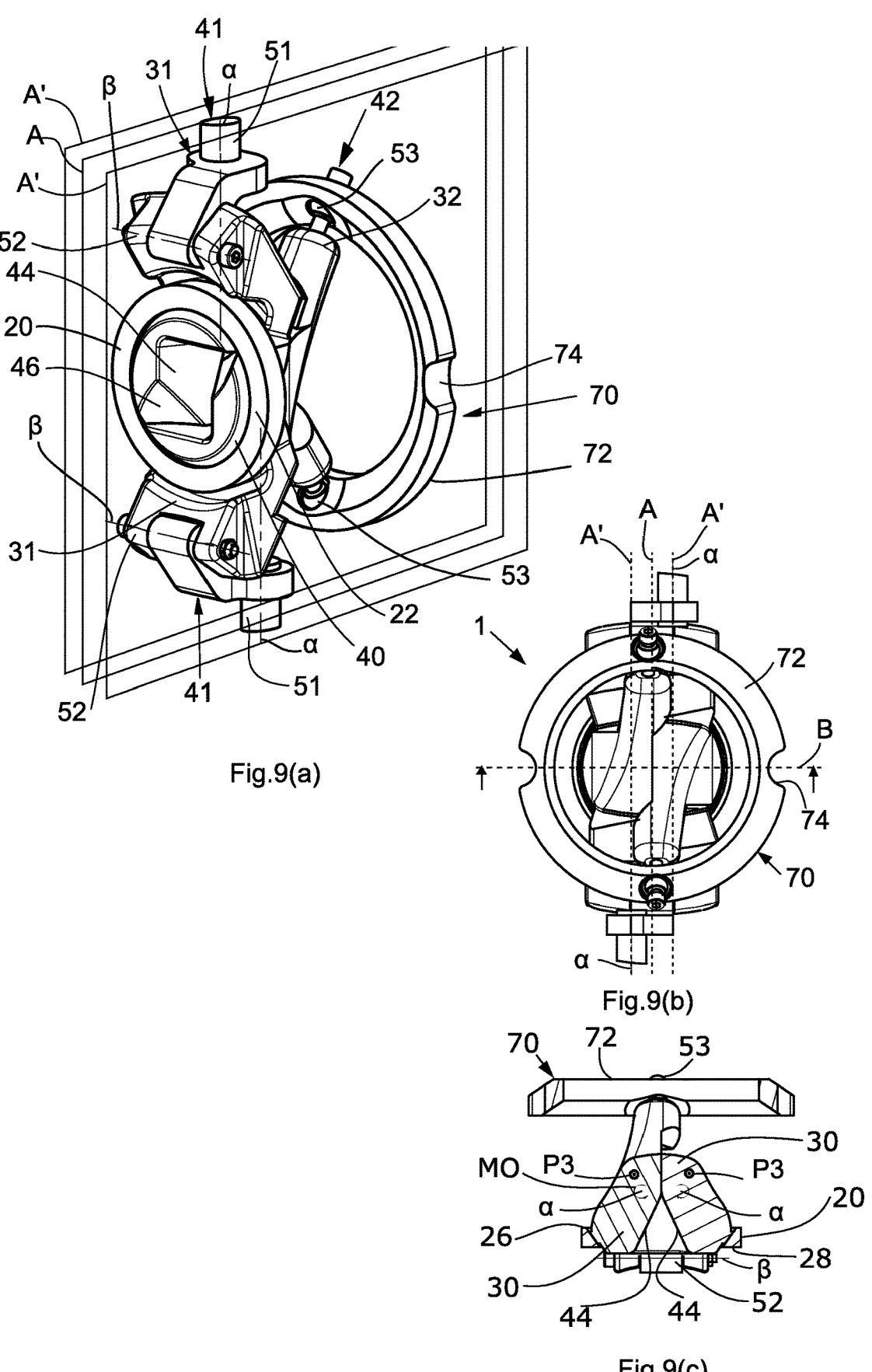

FIG. 9a to FIG. 9f show the valve 1 in the closed position 8. The obturating portions 30 can be seen extending across the aperture 18 and the mid-sections 33 of the obturating portions 30 obturating the aperture 18 at the valve seat 20. FIG. 9c shows a cross section view taken at the lateral plane B showing the profile of the mid-section 33 of the obturating portion. The arrows marked MO show the direction of initial movement of the obturating portions 10 as the valve 1 starts to open.

Figures 9D, 9E, 9F:
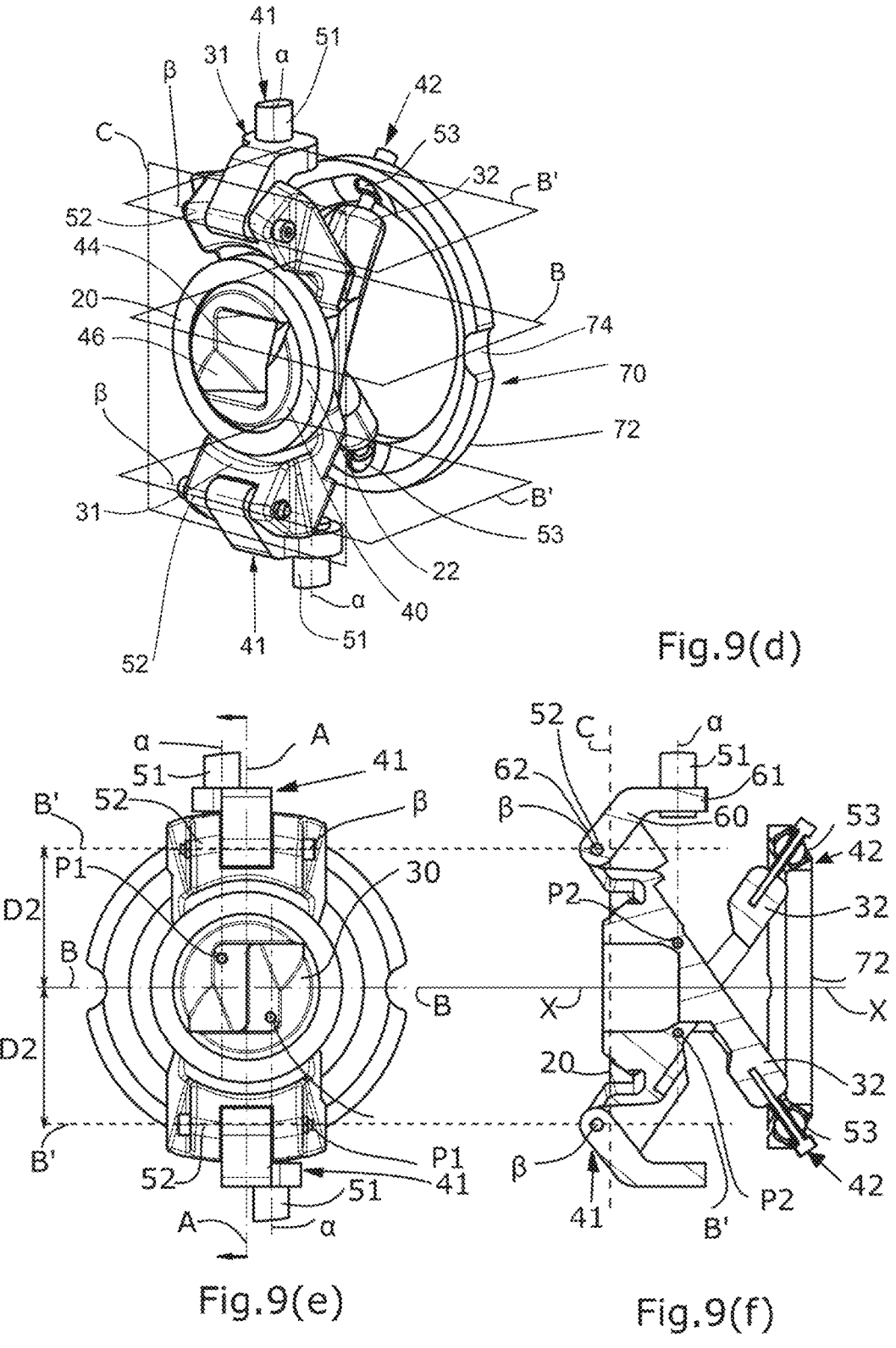
FIG. 9d a pictorial view, FIG. 9e a front view.
FIG. 9f a side section view.

FIG. 9a shows the location of planes A and A' in 3 dimensions. FIG. 9d shows the location of planes B, b' and C in 3 dimensions. FIG. 9e and cross section view FIG. 9f taken at plane A show the planes B and B' end on.

While the arrangements above provide the desired motion in operation and a degree of pressure balancing, FIG. 9 shows additional constraints that can be applied to ensure the valve 1 remains pressure balanced in the first closed position 8. The 3D geometry of the obturating portions means there are additional components of force that must be considered in addition to that resulting from the force exerted at each first centre of pressure point P1 and the resultant lever arm created at about the first axis $\alpha$. Thus, there are a centre of pressure and resulting force in the remaining two directions. There is a second centre of pressure point P2 when the valve is viewed in the direction of plane A shown in FIG. 9f. There is a third centre of pressure point P3 when the valve is viewed in the direction of plane B as shown in FIG. 9c. The pressure of a fluid in the pipe 2 results in a force acting on the obturating portions when in the closed position 8. This force due to the 3d profile of the obturating portions acts on each obturating portion in three orthogonal directions at the centres of pressure P1, P2 and P3 in the direction of the view in which they have been defined. This force has a resultant lever arm and a resultant moment M1, M2 and M3 from the force at P1, P2 and P3 respectively. The moment from M1 from centre of pressure P1 is balanced by the aforementioned axis $\alpha$ located on first offset plane A'. A pressure balanced condition can be maintained regarding M2 when each centre of pressure P2 is coincident with axis α when viewed in the plane A and the moment from M3 is balanced when each third pivot 53 is located on the respective longitudinal plane A of the obturating portion 30. Preferably, the third pivots 53 of opposite obturating portions are aligned with a single plane passing through axis X, wherein that plane is normal to the respective axes β of the opposite obturating portions, for example lateral plane A. Alternatively, some combination of deviation from this ideal such that resulting moments are cancelled, e.g. P1 may be moved closer to longitudinal plane A if P2 is moved closer to the valve seat 20 of the respective obturating portion, such that their contribution to torque around axis α is kept equal and opposite in direction.

FIG. 10a to FIG. 10e show the valve 1 with the valve mechanism 70 rotated 3% towards the open position. As viewed in FIGS. 10 and 11 the valve mechanism 70 via the control ring 72 is rotated anti-clockwise, however, it should be noted that the invention would work with the features of the valve 1 arranged to move in the opposite direction. Initial rotation at the first pivot 51 and the second pivot 52 is almost completely at the first pivot 51 about the first axis α as the second non-fixed pivot mounts 42 are translating circumferentially about axis X parallel or near parallel to the second axis β.

Figures 10A, 10B, 10C:
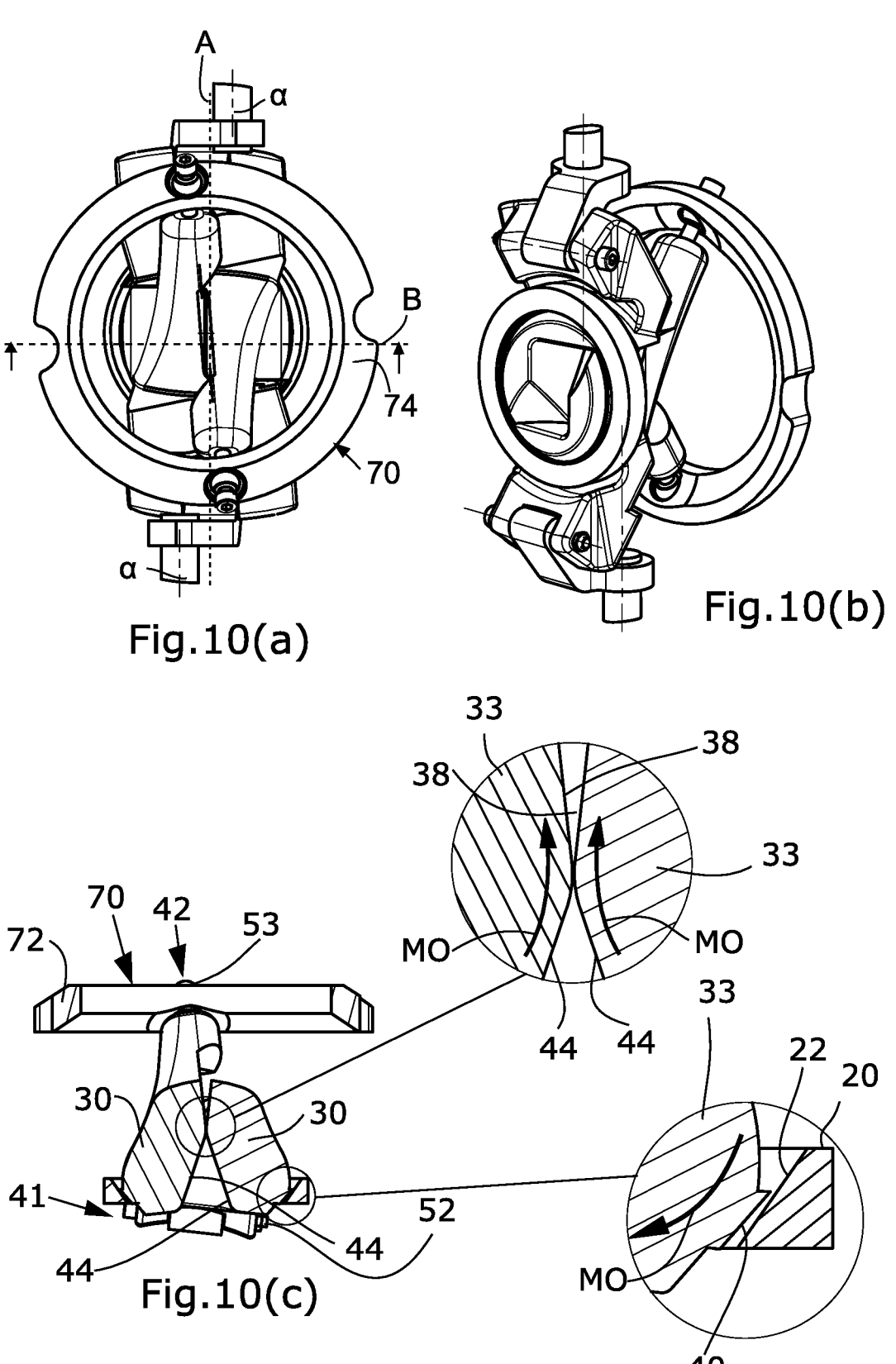

FIG. 10c includes detailed views demonstrating the clearance challenges addressed by the current invention and in particular the benefit of having initial rotation only or mainly about the first pivot 51. In the first detail view showing the first valve sealing faces 38, the offset of the valve sealing faces 38 in a first direction along the axis X to at or above the level of the first pivot 51 creates a zero interference and zero or low friction condition when the valve 1 begins to open. The second detail view includes the valve seat 20 and the pipe sealing faces 40. The view shows the initial movement of the pipe sealing face 40 relative to the tapered valve seat surface 22 this is a product of the axis α intersecting the lateral plane B in region R as described above. As the initial movement of the valve is substantially rotation about the first axis α the position of each axis α relative to the centre of pressure of the respective obturating portion can be used to create a pressure balance state when the valve is closed. The arrows marked MO show the direction of initial movement of the obturating portions 30 as the valve 1 starts to open.

As the valve mechanism 70 and in particular the control ring 72 is rotated further causing the second non-fixed pivot mounts 42 and the second ends of the obturating portions 30 connected there to translate circumferentially about axis X the amount of rotation of each obturating portion 30 about the respective first axis α decreases and the amount of rotation of each obturating portion 30 about second axis β increases until the mechanism is approximately 50% open.

Figure 11A:
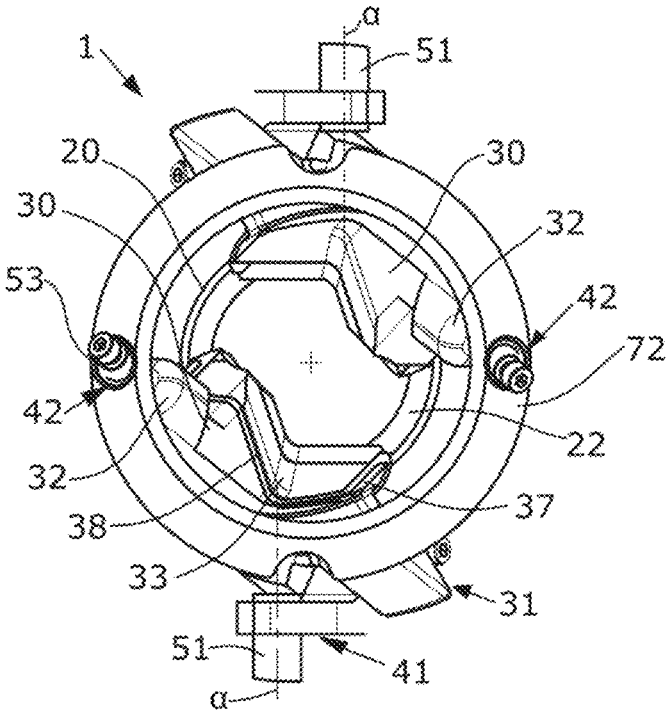
FIG. 11 shows the valve of FIG. 4a and FIG. 4b the current invention in position where the control ring is rotated 50% towards open position, showing in FIG. 11a a back view.
FIG. 11b a pictorial view.
Figure 11B:
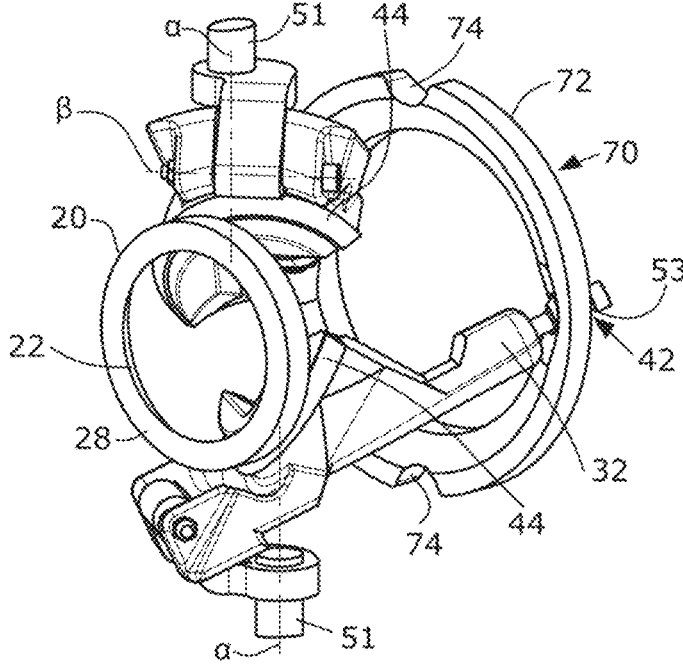

FIG. 11a and FIG. 11b show the valve 1 with the valve mechanism 70 rotated 50% towards the open position. Again, as in FIGS. 9 and 10 the control ring 72 of the valve mechanism 70 is rotated further causing the second non-fixed pivot mounts 42 and the second ends of the obturating portions 30 connected there to translate circumferentially about axis X. At this point rotation of the obturating portions 30 is all or nearly all about the second pivots 52 of the obturating portions 30 as translation of the second non-fixed pivot mounts 52 is parallel or close to parallel with the second axis of rotation β of the second pivot 52. Rotation about the second pivot 52 causes the obturating portions 30 to move out of the aperture 18. From approximately this point in the movement of the valve 1 from the closed position 8 to the open position 9 the direction of rotation of the obturating portions 30 about their respective first pivots 51 changes direction as the respective second ends 32 stop moving away from the longitudinal plane A and start to return towards plane A.

FIG. 12a to FIG. 12d show a schematic of an embodiment having three obturating portions 30. The schematic shows, the first end 31 of each obturating portion 30 connected to a first fixed pivot mount 41 and a second end 32 of each obturating portion connected to a second non-fixed pivot mount 42. The fixed pivot mount 41 is denoted by the fixed symbol which includes a triangle on top of a horizontal line with three diagonal lines coming from the bottom, indicating that the first fixed pivot mount 41 is not free to translate. The non-fixed pivot mount 42 is free to translate.

Figures 12A, 12B, 12C, 12D:
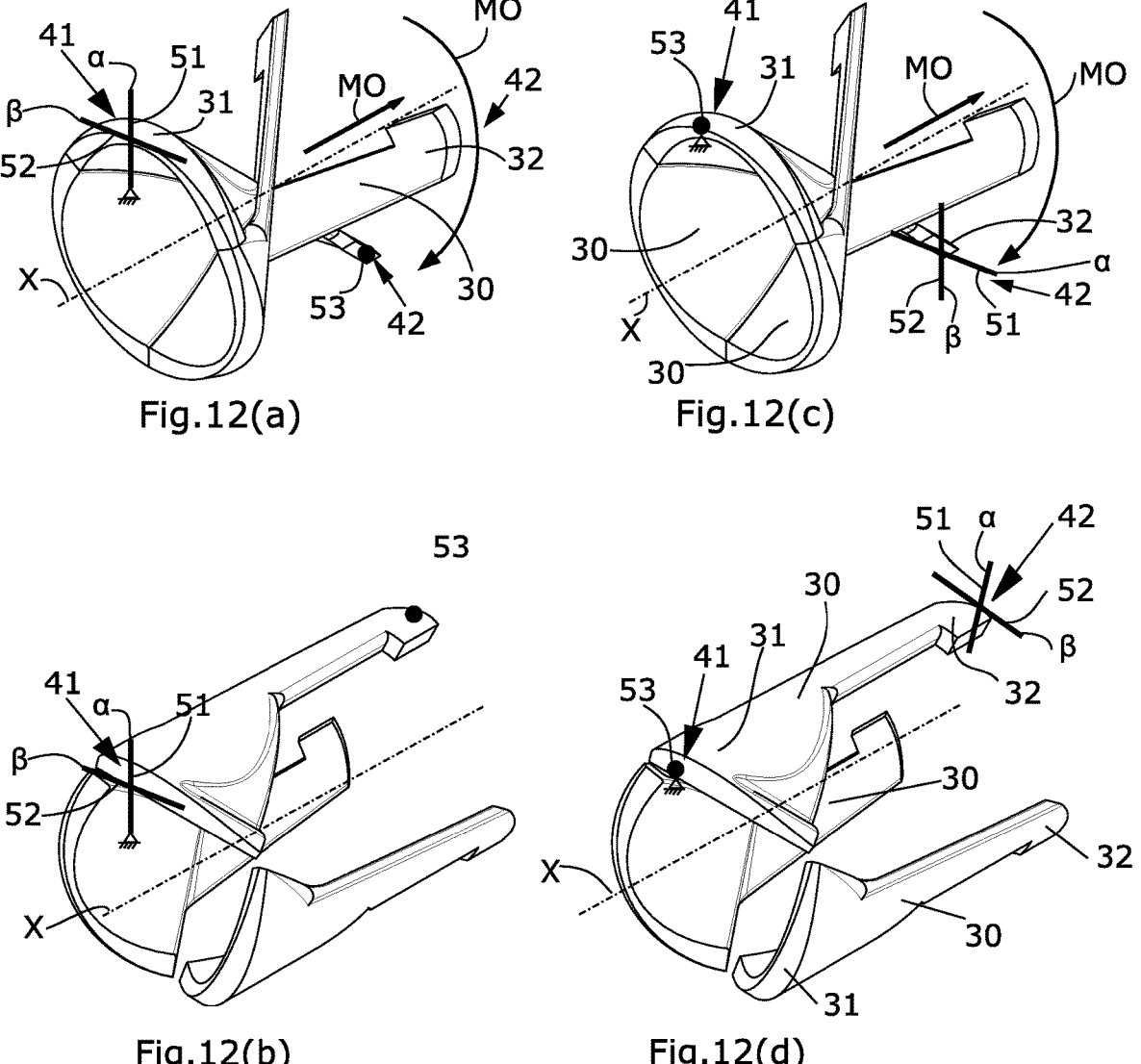
FIG. 12 shows schematic views of an embodiment of a valve according to the current invention showing possible positions of the first and second pivots and the third pivot.

FIG. 12a and FIG. 12b show an embodiment of the valve 1 in the first closed position 8 and the second open position 9 respectively. One of the obturating portions 30 in each image shows two axes at the first fixed pivot mount 41, indicating that the first pivot mount 41 is constrained to two axes (two rotational degree of freedom) and at the second non-fixed pivot mount 42 the obturating portion 30 shows a ball indicating three rotation degrees of freedom. Thus in this arrangement the two axes remain fixed and the ball is free to translate.

FIG. 12c and FIG. 12d shows a further embodiment of the valve 1 also in the first closed position 8 and the second open position 9 respectively. One of the obturating portions 30 in each drawing shows a ball indicating that the first pivot mount 41 is free to rotate about three rotational degrees of freedom and at the second pivot mount 42 there is shown two axes indicating that the second non-fixed pivot mount 42 constrained to two axes (two rotational degree of freedom). Thus in this arrangement the ball remains fixed and the two axes are free to translate.

It will be understood that whilst the schematic is shown with three obturating portions 30 the features of the schematic embodiments can be used with any plurality of obturating portions.

Figures 13A, 13B:
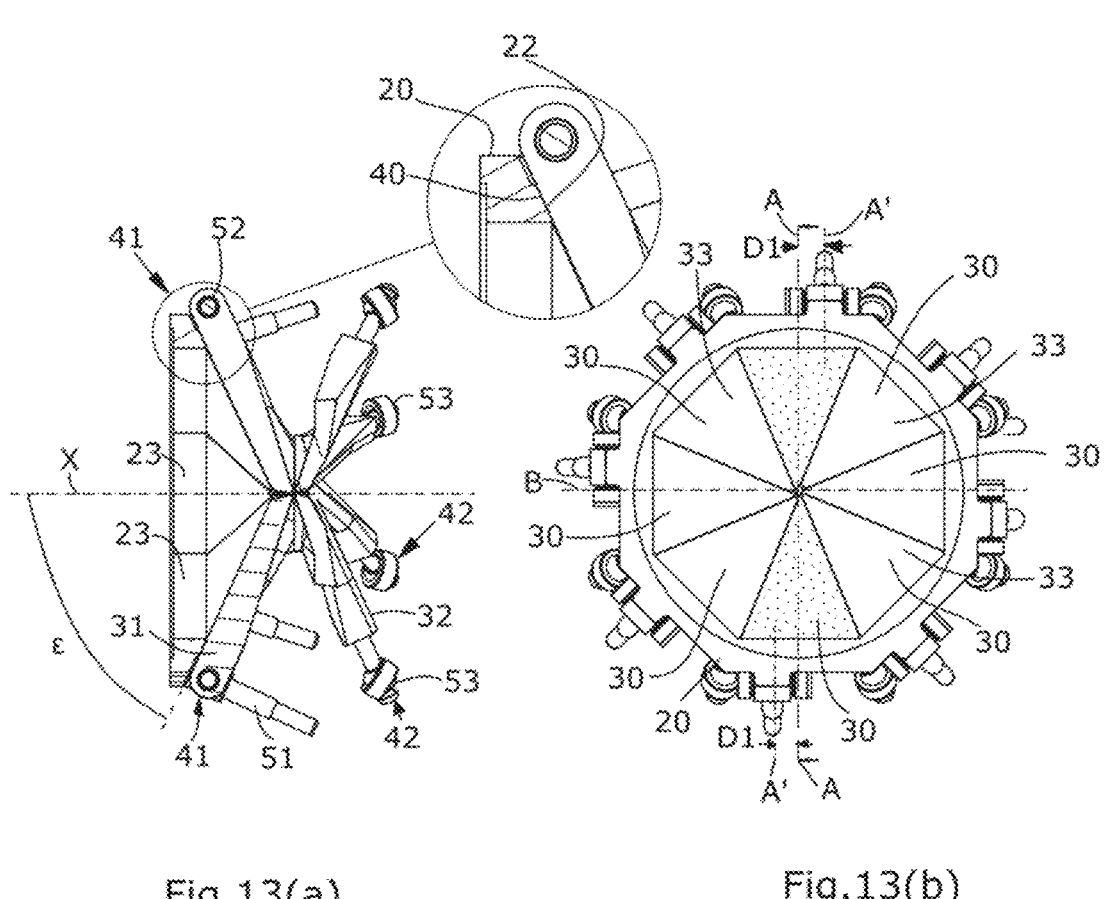
FIG. 13b a front view.
Figures 13C, 13D, 13E:
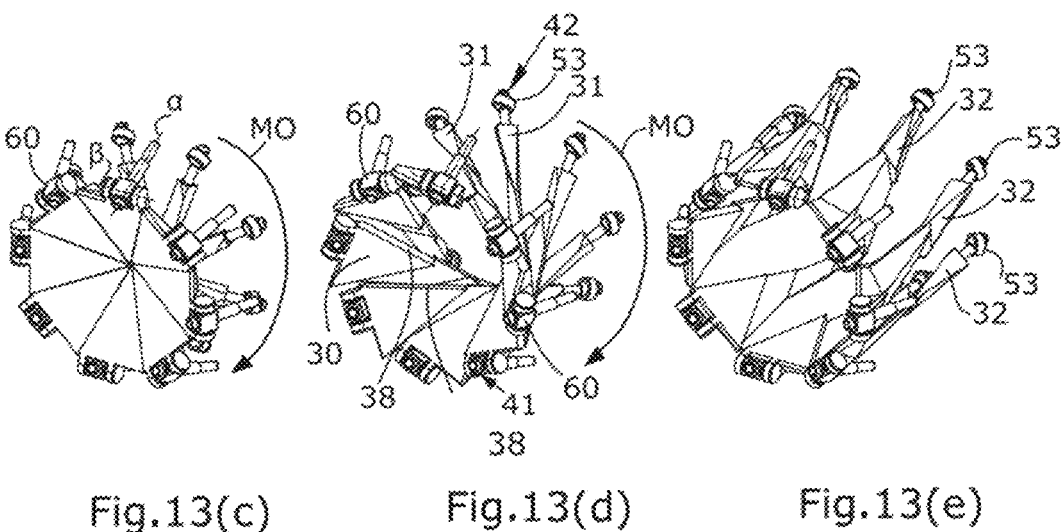
FIG. 13c a pictorial view.
FIG. 13d a pictorial view in a position between the closed position and the open position; 13e a pictorial view in open position.

An alternative embodiment of the valve 1 of the current invention will now be described with reference to FIG. 13a to FIG. 13e. The valve 1 of FIG. 13 includes 8 obturating portions 30. The axis α and β are positioned as disclosed above for FIGS. 4 to 8 and intersect as shown in FIG. 13a and the first pivot 51 and the second pivot 52 are joined by a linkage 60. The seat 20 includes an externally sealing conical sealing surface 23. The externally sealing surface has an angle ε less than 90 degrees to the axis X. The seat further includes the conical sealing surface 23 split into a plurality of radially extending flat valve seat portions 24 to create a polygonal conical seat. There are preferably the same number of radially extending flat valve seat portions 24 as there are obturating portions 30 in a valve 1.

In FIG. 17b the position of the two planes A and two planes B of the two shaded obturating portions are shown with respective offset planes A'.

It will be understood that a tapered valve seat surface 22 can also comprise a plurality of radially extending flat valve seat portions 24.

Any system feature as described herein may also be provided as a method feature, and vice versa. As used herein, means plus function features may be expressed alternatively in terms of their corresponding structure.

Any feature in one aspect or embodiment may be applied to other aspects, in any appropriate combination. In particular, method aspects may be applied to system aspects, and vice versa.

Furthermore, any, some and/or all features in one aspect or embodiment can be applied to any, some and/or all features in any other aspect or embodiment, in any appropriate combination.

It should also be appreciated that particular combinations of the various features described and defined in any aspects can be implemented and/or supplied and/or used independently.

The invention claimed is:

1. A valve for obturating a pipe, the valve having:
a central axis X,
a body having an inlet and an outlet,
a body wall defining an aperture extending between the inlet and the outlet,
a plurality of obturating portions for obturating said aperture,
a valve mechanism connectable to an actuator,
the plurality of obturating portions, moveable from a first closed position when the valve is closed to a second open position when the valve is open by the valve mechanism,
the body wall including a valve seat for receiving the plurality of obturating portions,
each obturating portion having a first end and a second end and a mid-section for sealing the aperture, the mid-section including a valve sealing face, for sealing to another of the obturating portions, and a pipe sealing face for sealing to the pipe;
a plurality of first fixed pivot mounts on the body and wherein the first end of each obturating portion is pivotally mounted within one of the plurality of first fixed pivot mounts;
a plurality of second non-fixed pivot mounts connected to the valve mechanism and wherein the second end of each obturating portion is pivotally mounted within one of the plurality of second non-fixed pivot mounts; and
wherein the valve mechanism and hence each second non-fixed pivot mount is movable in three dimensions between the first closed position and the second open position.

2. The valve according to claim 1, wherein the valve mechanism is configured to move the plurality of second non-fixed pivot mounts along axis X, and circumferentially about axis X, to cause the obturating portions to move radially, axially relative to and circumferentially about axis X from the first closed position to the second open position.

3. The valve according to claim 1, and each first fixed pivot mount including a first pivot having a first axis of rotation α and a second pivot having a second axis of rotation β and each second non-fixed pivot mount comprising a third pivot free to rotate around all three axes.

4. The valve according to claim 3, including a transverse plane C perpendicular to said axis X and further including, for each obturating portion, a longitudinal plane A, coincident with axis X and a first offset plane A' offset a distance D1 from said longitudinal plane A, wherein the first axis α is coincident with a first plane A'.

5. The valve according to claim 4, wherein each obturating portion includes a first center of pressure point P1 when the obturating portion is viewed in said transverse plane C with the valve in the closed position; and
wherein the first plane A' rests on said first center of pressure point P1.

6. The valve according to claim 5, wherein when in the closed position, each obturating portion includes a second center of pressure point P2 when viewed in the longitudinal plane A and a third center of pressure point P3 when viewed in the lateral plane B; and
wherein the center of pressure point P2 of each obturating portion is coincident with the respective axis α when viewed in its respective longitudinal plane A;
for maintaining a pressure balanced state when the valve 1 is in the closed position 8.

7. The valve according to claim 4, wherein when in the closed position each obturating portion includes a first center of pressure point P1 when viewed in the transverse plane C, a second center of pressure point P2 when viewed in the longitudinal plane A and a third center of pressure point P3 when viewed in the lateral plane B, each center of pressure point P1, P2, P3 having an associated force and an associated moment M1 M2 and M3 respectively, exerted on the respective obturating portion; and wherein each center of pressure point P1 is offset from the respective axis α when viewed in the transverse plane C and each center of pressure point P2 is offset from the respective axis α when viewed in the respective longitudinal plane A such that the associated moments act in opposite directions such that they cancel, resulting in a combined moment of zero.

8. The valve according to claim 4, including for each obturating portion a lateral plane B coincident with axis X and perpendicular to longitudinal plane A;
wherein, when the valve is in the closed position, the second axis β is coincident with a second offset plane B' offset a distance D2 from lateral plane B.

9. The valve according to claim 4, including for each obturating portion a lateral plane B coincident with axis X and perpendicular to longitudinal plane A and each pipe sealing face having a first end on the side of the longitudinal plane A having the center of pressure of a respective obturating portion and a second end on the opposite side of the longitudinal plane A to the first end;
wherein the first axis of rotation α of a respective obturating portion intersects the lateral plane B associated with said respective obturating portion in a region R bounded by a first line F and a second line G;
the first line F extending along said lateral plane B perpendicular to the surface of the seat sealing face at the point the valve seat intersects said lateral plane B on a first side of the Longitudinal plane A; and
the second line G extending along said lateral plane B perpendicular to a line projected onto the lateral plane B from the valve seat surface at the point the second end sits when in the closed position.

10. The valve according to claim 4, wherein the valve seat has a first end proximal the valve mechanism and a second end distal the valve mechanism and transverse plane C is coincident with the second end of the valve seat; and
second axis β intersects the longitudinal plane A of the respective obturating portion on the opposite side of plane C to the valve mechanism.

11. The valve according to claim 4, wherein a third line H extends along the longitudinal plane A of a respective obturating portion 30 perpendicular to the valve seat surface at the point the valve seat intersects the longitudinal plane A; and
the second axis β intersects the longitudinal plane A in a region S bounded by the transverse plane C and the third line H.

12. The valve according to claim 4, wherein the second non-fixed pivot mount is located radially from axis X outside of the seat.

13. The valve according to claim 3, wherein the third pivots of the respective obturating portions are located on the longitudinal plane A when in the closed position.

14. The valve according to claim 3, wherein the third pivot comprises a spherical joint.

15. The valve according to claim 3, wherein each first pivot is connected to its respective second pivot by a linkage;

the linkage is connected to the body or the valve mechanism by the first pivot and the linkage is connected to the respective obturating portion by the second pivot.

16. The valve according to claim 15, wherein the linkage includes a first end and a second end separated by a length L; and the first pivot is located at the first end of the linkage and the second pivot is at the second end of the linkage, such that the first axis $\alpha$ is offset from the second axis $\beta$ by said length L.

17. The valve according to claim 3 wherein the first axis $\alpha$ and the second axis $\beta$ intersect.

18. The valve according to claim 1, and each first fixed pivot mount comprising a third pivot free to rotate around all three axes and each second non-fixed pivot mount including a first pivot having a first axis of rotation a and a second pivot having a second axis of rotation $\beta$.

19. The valve according to claim 1, wherein the valve seat includes a circumferentially extending tapered valve seat surface.

20. The valve according to claim 19, wherein the valve seat surface is divided into one or more flat valve seat portions.

21. The valve according to claim 19, wherein said valve seat surface is at an angle $\varepsilon$ less than 90 Degrees to the axis X.

22. The valve according to claim 1, wherein there are n obturating portions each comprising one or more valve sealing faces, including a first valve sealing face extending from the axis X radially towards the first fixed pivot mounting and a second valve sealing face extending radially from axis X an angle of 360/n to the first valve sealing face.

23. The valve according to claim 1, wherein the one or more valve sealing faces are parallel to axis X.

24. The valve according to claim 1, wherein the pipe sealing face is tapered to match the valve seat surface.

25. The valve according to claim 1, wherein a portion of each first valve sealing face proximal the valve seat extends away from longitudinal plane A on the opposite side of the longitudinal plane A to the center of pressure P.

26. The valve according to claim 1, wherein a portion of the second valve sealing face proximal the valve seat extends away from longitudinal plane A on the same side of the longitudinal plane A to the center of pressure P.

27. The valve according to claim 1, wherein the one or more valve sealing faces are offset in first direction along axis X and connected to the pipe sealing face by intermediate sealing faces to form a continuous seal about the obturating portion.

28. The valve according to claim 1, wherein the valve sealing faces include a chamfered lower edge for clearance between the plurality of obturation portions when moving from the first closed position to the second open position.

29. The valve according to claim 1, wherein the valve mechanism includes a control ring comprising the plurality of second non-fixed pivot mounts for connecting the plurality of obturating portions to the control ring.

30. The valve according to claim 29 wherein the body includes a control ring guide for limiting the motion of the control ring to translation along axis X and rotation about axis X.

31. The valve according to claim 29 wherein the control ring includes an engagement means for engaging an actuator.

32. The valve according to claim 31, further comprising one or more actuators for moving the control ring.

33. The valve according to claim 32 wherein the one or more actuators include a magnetic coupling.

34. The valve according to claim 1, wherein the body wall is continuous with no apertures except the inlet and the outlet.

35. The valve according to claim 1, wherein the inlet and the outlet comprise a flanged, threaded or welded pipe connection.

* * * * *